US010257915B2

(12) United States Patent
Wan et al.

(10) Patent No.: US 10,257,915 B2
(45) Date of Patent: Apr. 9, 2019

(54) TIME-DELAY LIGHTING CIRCUIT AND DEVICE THEREOF

(71) Applicant: ZHEJIANG SHENGHUI LIGHTING CO., LTD, Jiaxing (CN)

(72) Inventors: Yehua Wan, Jiaxing (CN); Jinxiang Shen, Jiaxing (CN)

(73) Assignee: ZHEJIANG SHENGHUI LIGHTING CO., LTD, Jiaxing (CN)

(*) Notice: Subject to any disclaimer, the term of this patent is extended or adjusted under 35 U.S.C. 154(b) by 106 days.

(21) Appl. No.: 15/536,571

(22) PCT Filed: Dec. 16, 2016

(86) PCT No.: PCT/CN2016/110431
§ 371 (c)(1),
(2) Date: Jun. 15, 2017

(87) PCT Pub. No.: WO2017/219631
PCT Pub. Date: Dec. 28, 2017

(65) Prior Publication Data
US 2018/0199418 A1    Jul. 12, 2018

(30) Foreign Application Priority Data
Jun. 24, 2016   (CN) .......................... 2016 1 0493747

(51) Int. Cl.
H05B 37/02    (2006.01)
H05B 33/08    (2006.01)
(Continued)

(52) U.S. Cl.
CPC ........ H05B 37/0281 (2013.01); H02J 7/0068 (2013.01); H02M 3/33523 (2013.01);
(Continued)

(58) Field of Classification Search
CPC .......................... H05B 37/0281; H05B 33/08; H05B 33/0845; H05B 33/0815; H05B 33/083; H05B 33/0887; H02J 7/0068; H02J 7/345
See application file for complete search history.

(56) References Cited

FOREIGN PATENT DOCUMENTS

CN    202065869 U    12/2011
CN    202551412 U    11/2012
(Continued)

OTHER PUBLICATIONS

The World Intellectual Property Organization (WIPO) International Search Report for PCT/CN2016/110431 dated Mar. 27, 2017 pp. 1-5.

Primary Examiner — Robert Deberadinis
(74) Attorney, Agent, or Firm — Anova Law Group, PLLC

(57) ABSTRACT

The present disclosure provides a time-delay lighting circuit and a lighting device. The time-delay lighting circuit includes a first voltage-current conversion circuit configured to convert a first inputted current to a current satisfying working conditions of the light emitting component; an energy storage and discharge device configured to provide power to the light emitting component when the control switch is switched off to disconnect the external power source from the time-delay lighting circuit; a charging controller configured to charge the energy storage and discharge device when the control switch is switched on to connect the external power source to the time-delay lighting circuit; and a switch status detection circuit configured to detect an on/off status of the control switch, and when the control switch is detected to be switched off, control the energy storage and discharge device to provide power to the light emitting component.

20 Claims, 29 Drawing Sheets

(51) Int. Cl.
*H02J 7/00* (2006.01)
*H02M 3/335* (2006.01)
*H02J 7/34* (2006.01)

(52) U.S. Cl.
CPC ......... *H05B 33/08* (2013.01); *H05B 33/0815* (2013.01); *H05B 33/0845* (2013.01); *H05B 33/0887* (2013.01); *H02J 7/345* (2013.01); *H05B 33/083* (2013.01)

(56) References Cited

FOREIGN PATENT DOCUMENTS

| | | |
|---|---|---|
| CN | 105979661 A | 9/2016 |
| CN | 205847658 U | 12/2016 |

TIME-DELAY LIGHTING CIRCUIT AND DEVICE THEREOF

CROSS-REFERENCES TO RELATED APPLICATIONS

This application is a national phase entry under 35 U.S.C. § 371 of International Application No. PCT/CN2016/110431, filed on Dec. 16, 2016, which claims the priority of Chinese Patent Application No. 201610493747.4 filed on Jun. 24, 2016, the entire content of all of which is incorporated herein by reference.

FIELD OF THE DISCLOSURE

The present disclosure relates to the field of lighting technology and, more particularly, relates to a time-delay lighting circuit and device thereof.

BACKGROUND

LED (Light Emitting Diode) is a solid-state semiconductor device that directly converts electric energy to visible light. Due to numerous advantages such as being energy-saving, environmental friendly, optically controllable, and having strong practicability, high stability, a short response time, and a long service life, nowadays, LED lighting devices have been widely applied in various lighting industries to advocate a low-carbon lifestyle.

LED lighting devices often realize lighting via a power source provided by an external power source. When the control switch of a LED lighting device is switched off, the external power source may no longer supply power to the LED lighting device, and the LED lighting device will be turned off. By then, users may need to carry out activities in the dark, resulting in potential safety issues.

BRIEF SUMMARY OF THE DISCLOSURE

The present disclosure provides a time-delay lighting circuit and device thereof to realize time-delay lighting after the lighting device is disconnected to an external power source.

One aspect of the present disclosure provides a time-delay lighting circuit for controlling a light emitting component. An input end of the time-delay lighting circuit is connected to an external power source via a control switch. The time-delay lighting circuit may include a first voltage-current conversion circuit configured to convert a first inputted current to a current satisfying working conditions of the light emitting component; an energy storage and discharge device configured to provide power to the light emitting component when the control switch is switched off to disconnect the external power source from the time-delay lighting circuit; a charging controller configured to charge the energy storage and discharge device when the control switch is switched on to connect the external power source to the time-delay lighting circuit; and a switch status detection circuit configured to detect an on/off status of the control switch, and when the control switch is detected to be switched off, control the energy storage and discharge device to provide power to the light emitting component. Further, an input end of the first voltage-current conversion circuit is connected to the external power source via the control switch, and an output end of the first voltage-current conversion circuit is connected to the light emitting component; the switch status detection circuit is connected to the first voltage-current conversion circuit and the energy storage and discharge device, respectively; and the charging controller is connected to the external power source and the energy storage and discharge device, respectively.

Optionally, the first voltage-current conversion circuit is further configured to: when the control switch is switched on, convert the first inputted current from the external power source to the current satisfying working conditions of the light emitting component; and when the switch status detection circuit detects that the control switch is switched off, according to a switch-on signal from the switch status detection circuit, convert the first inputted current from the energy storage and discharge device to the current satisfying working conditions of the light emitting component.

Optionally, the switch status detection circuit is configured to: output a switch-on signal to the first voltage-current conversion circuit when the control switch is detected to be switched off, such that the energy storage and discharge device provides power supply to the light emitting component via the first voltage-current conversion circuit; detect a voltage outputted by the energy storage and discharge device; and output a switch-off signal to the first voltage-current conversion circuit when the voltage outputted by the energy storage and discharge device is detected to be lower than a preset value. Further, the first voltage-current conversion circuit switches off the power supply from the energy storage and discharge device to the light emitting component when receiving the switch-off signal.

Optionally, the time-delay lighting circuit may further include an AC-DC converter configured to convert an AC output of the external power source to a DC output. Further, an input end of the AC-DC converter is connected to the external power source via the control switch; and an output end of the AC-DC converter is connected to the first voltage-current conversion circuit and the charging controller, respectively.

Optionally, the switch status detection circuit is further configured to: detect the on/off status of the control switch by determining whether an output voltage of the AC-DC converter is below a threshold; and when the output voltage of the AC-DC converter is detected to be less than the threshold, the switch status detection circuit outputs a switch-on signal to the first voltage-current conversion circuit for enabling the energy storage and discharge device to provide power to the light emitting component.

Optionally, the time-delay lighting circuit may further include a second voltage-current conversion circuit configured to convert a second inputted current to the current satisfying working conditions of the light emitting component. The second voltage-current conversion circuit is connected to the energy storage and discharge device, and the switch status detection circuit, respectively; when the switch status detection circuit detects the control switch is switched-off and outputs a switch-on signal to the second voltage-current conversion circuit, the second inputted current is from the energy storage and discharge device for enabling the energy storage and discharge device to provide power to the light emitting component; and when the control switch is switched-on, the first voltage-current conversion circuit converts the first inputted current from the external power source to the current satisfying working conditions of the light emitting component.

Optionally, the light emitting component may include multiple light emitting entities; the switch status detection circuit is further configured to send a switch-on signal to the second voltage-current conversion circuit for controlling the energy storage and discharge device to provide power supply to at least one of the multiple light emitting entities; and the second voltage-current conversion circuit is further configured to, when receiving the switch-on signal from the switch status detection circuit, convert an inputted current to a current satisfying working conditions of the at least one of the multiple light emitting entities.

Another aspect of the present disclosure provides a time-delay lighting circuit for controlling a light emitting component, an input end of the time-delay lighting circuit being connected to an external power source via a control switch. The time-delay lighting circuit may include an AC-DC converter, a first voltage-current conversion circuit, a switch status detection circuit, a second voltage-current conversion circuit, a charging controller, and an energy storage and discharge device. The AC-DC converter is connected to the first voltage-current conversion circuit, and the first voltage-current conversion circuit is connected to the light emitting component. The AC-DC converter is connected to the switch status detection circuit and the charging controller, respectively; the switch status detection circuit is connected to the second voltage-current conversion circuit and the energy storage and discharge device, respectively; the energy storage and discharge device is connected to the charging controller and the second voltage-current conversion circuit, respectively; and the second voltage-current conversion circuit is connected to the light emitting component. Further, the switch status detection circuit is configured to detect an on/off status of the control switch, and when the control switch is detected to be switched off, output a switch-on signal to the second voltage-current conversion circuit. The second voltage-current conversion circuit is configured to receive the switch-on signal outputted by the switch status detection circuit, and control the energy storage and discharge device to provide a voltage satisfying preset conditions to the light emitting component. The charging controller is configured to charge the energy storage and discharge device when the AC-DC converter outputs a direct voltage.

Optionally, the energy storage and discharge device is a super-capacitor.

Optionally, the switch status detection circuit is further configured to detect a voltage outputted by the energy storage and discharge device; and output a switch-off signal to the second voltage-current conversion circuit when the voltage outputted by the energy storage and discharge device is detected to be lower than a preset value. The second voltage-current conversion circuit is further configured to turn off the power supply from the energy storage and discharge device to the light emitting component when receiving the switch-off signal.

Optionally, the AC-DC converter also includes a filter circuit, a rectifier bridge and a second capacitor. The filter circuit includes a first inductor and a first capacitor, the first capacitor is connected to the external power source in parallel, a first end of the first inductor is connected to a first end of the first capacitor, a second end of the first inductor is connected to a first AC input end of the rectifier bridge, and a second AC input end of the rectifier bridge is connected to a second end of the first capacitor. Further, a first end of the second capacitor is connected to a first DC output end of the rectifier bridge and an input end of the first voltage-current conversion circuit at a first connection point, and a second end of the second capacitor is connected to a second DC output end of the rectifier bridge and is further connected to ground.

Optionally, the absorbing circuit may include a fourth capacitor, a second resistor and a second diode. The fourth capacitor is connected to the second resistor in parallel. A first end of the fourth capacitor and a first end of the second resistor are connected to the output end of the AC-DC converter, respectively. A first input end of the transformer and the first input end of the voltage-current conversion unit are connected at the first connection point, respectively. A second end of the fourth capacitor, a second end of the second resistor are connected to the cathode of the first diode, respectively. An anode of the second diode is connected to a second input end of the transformer and a drain (D) electrode of the MOS transistor in the voltage-current conversion unit, respectively.

Optionally, the absorbing circuit include a fourth capacitor, a second resistor and a second diode. The fourth capacitor is connected to the second resistor in parallel, and a first end of the fourth capacitor, a first end of the second resistor are connected to an output end of the AC-DC converter, a first input end of the transformer, and a first input end of the AC/DC controller at the first connection point, respectively. A second end of the fourth capacitor, a second end of the second resistor are connected to a cathode of the second diode, respectively. An anode of the second diode is connected to a second input end of the transformer and a drain (D) electrode of the MOS transistor, respectively.

Optionally, the first voltage-current conversion circuit may include a voltage-current conversion unit, a first resistor, an inductor, a diode, and a third capacitor. An input end of the voltage-current conversion unit, and a drain (D) electrode of a MOS transistor in the voltage-current conversion unit are connected at the first connection point. A source (S) electrode of the MOS transistor in the voltage-current conversion unit is connected to a first end of the first resistor and a cathode of the diode, respectively. The first output end of the AC-DC converter is connected to a second end of the first resistor and an input end of the inductor, respectively. A second output end of the voltage-current conversion unit is connected to ground. An output end of the inductor is connected to a first end of the third capacitor, and is further connected to a first end of the light emitting component. An anode of the diode is connected to a second end of the third capacitor and is further connected to ground.

Optionally, the light emitting component includes multiple light emitting entities. The switch status detection circuit is further configured to send a switch-on signal to the second voltage-current conversion circuit for controlling the energy storage and discharge device to provide power supply to at least one of the multiple light emitting entities. The second voltage-current conversion circuit is further configured to, when receiving the switch-on signal from the switch status detection circuit, convert the second inputted current to the current satisfying working conditions of the at least one of the multiple light emitting entities.

Another aspect of the present disclosure provides a time-delay lighting circuit for controlling a light emitting component, an input end of the time-delay lighting circuit being connected to an external power source via a control switch. The time-delay lighting circuit may include a first voltage-current conversion circuit, a second voltage-current conversion circuit, a charging controller, and an energy storage and discharge device. The first voltage-current conversion circuit may be configured to convert a current inputted from the external power source to a current satisfying working conditions of the light emitting component. The energy storage and discharge device may be configured to provide power to the light emitting component when the control switch is switched off to disconnect the external power source from the time-delay lighting circuit. The charging controller may be configured to charge the energy storage and discharge device when the control switch is switched on to connect the external power source to the time-delay lighting circuit. The second voltage-current conversion circuit may be configured to convert a current inputted from the energy storage and discharge device to the current satisfying working conditions of the light emitting component. Further, an input end of the first voltage-current conversion circuit is connected to the external power source via the control switch, and an output end of the first voltage-current conversion circuit is connected to the light emitting component; the second voltage-current conversion circuit is connected to the energy storage and discharge device and the light emitting component, respectively; and the charging controller is connected to the external power source and the energy storage and discharge device, respectively.

Optionally, the time-delay lighting circuit may further include an AC-DC converter configured to convert an AC output of the external power source to a DC output. An input end of the AC-DC converter is connected to the external power source via the control switch; and an output end of the AC-DC converter is connected to the first voltage-current conversion circuit and the charging controller, respectively.

Optionally, the second voltage-current conversion circuit may be further configured to: detect a voltage inputted from the energy storage and discharge device; turn off a power supply from the energy storage and discharge device to the light emitting component when the voltage inputted from the energy storage and discharge device is detected to be lower than a preset value; and turn on the power supply from the energy storage and discharge device to the light emitting component when the voltage inputted from the energy storage and discharge device is detected to be greater than the preset value;

Another aspect of the present disclosure provides a time-delay lighting device, which includes a light emitting component and a time-delay lighting circuit board. The time-delay lighting circuit is disposed on the time-delay lighting circuit board, and the light emitting component is electrically connected to the time-delay lighting circuit board. The time-delay lighting circuit may be any time-delay lighting circuit described above.

Optionally, the time-delay lighting device may further include a lamp cup, a lamp holder, a heat sink, and a lamp cover. The time-delay lighting circuit is disposed inside the lamp cup, and a closed-end of the lamp cup is connected to the lamp holder. The light emitting component is disposed in an open-end of the lamp cup, the lamp cover is disposed outside the light emitting component, and the heat sink is disposed between the light emitting component and the time-delay lighting circuit board.

Optionally, the light emitting component include one or more light emitting diodes.

The time-delay lighting circuit provided by the present disclosure can control the timing of discharging the energy storage and discharge device according to detected status of the control switch, and can implement delayed lighting, thus avoiding the occurrence of any potential safety issues.

BRIEF DESCRIPTION OF THE DRAWINGS

To describe the technical solutions in the embodiments of the present invention or in the prior art more clearly, the accompanying drawings required for describing the embodiments or the prior art are briefly introduced in the following. Apparently, the accompanying drawings in the following description are merely some embodiments of the present invention. Those skilled in the art can still obtain other drawings according to these accompanying drawings without any creative effort.

DETAILED DESCRIPTION

For clearer understanding of the object, technical solution and advantages of the present invention, the present invention is further illustrated below in details in combination with the embodiments and the accompanying drawings. It is apparent that the described embodiments are some but not all of the embodiments of the present invention. Based on the disclosed embodiment, persons of ordinary skill in the art may derive other embodiments consistent with the present disclosure, all of which are within the scope of the present invention.

Figure 1A:
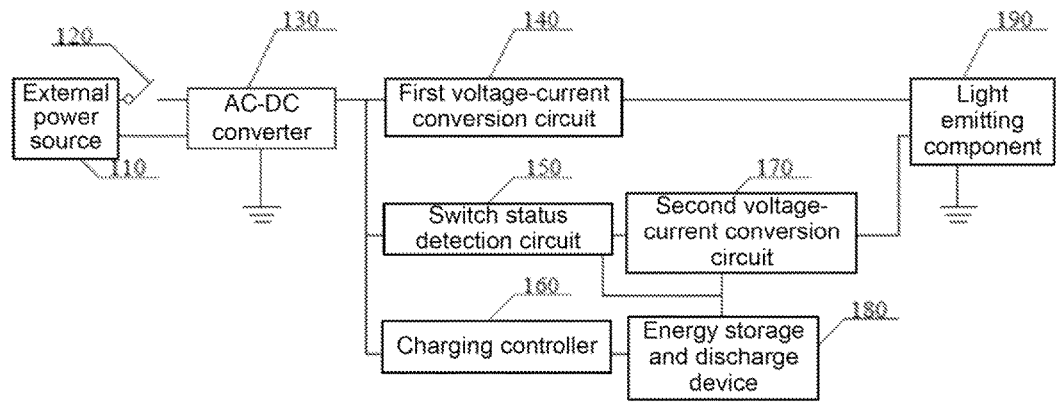
FIG. 1A illustrates a structural diagram of an exemplary time-delay lighting circuit consistent with the disclosed embodiments.
Figure 1B:
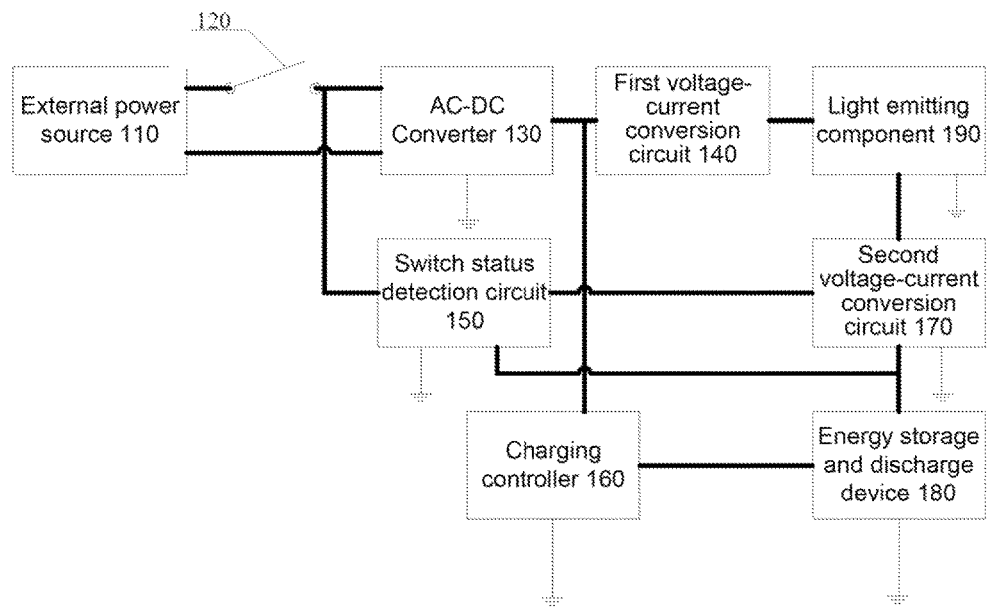
FIG. 1B illustrates another structural diagram of an exemplary time-delay lighting circuit consistent with the disclosed embodiments.

FIG. 1A and FIG. 1B illustrate structural diagrams of two exemplary time-delay lighting circuits consistent with the disclosed embodiments. As shown in FIG. 1A and FIG. 1B, the time-delay lighting circuit provided by this embodiment may be configured to control a light emitting component 190 (i.e., luminescent module), and an input end of the time-delay lighting circuit may connect to an external power source 110 (e.g., power grid) via a control switch 120. The time-delay lighting circuit may include an AC-DC converter 130, a first voltage-current conversion circuit 140, a switch status detection circuit 150, a charging controller 160, a second voltage-current conversion circuit 170, and an energy storage and discharge device 180.

An input end of the AC-DC converter 130 may connect to the external power source 110 via the control switch 120. An output end of the AC-DC converter 130 may connect to the first voltage-current conversion circuit 140. The first voltage-current conversion circuit 140 may be connected to the light emitting component 190 and configured to convert an input voltage/current (e.g., from the external power source 110) to a normal operating voltage/current of the light emitting component 190. In some embodiments, the first voltage-current conversion circuit 140 may be a high-to-low voltage converter.

The switch status detection circuit 150 may connect to the second voltage-current conversion circuit 170 and the energy storage and discharge device 180, respectively. The energy storage and discharge device 180 may connect to the charging controller 160 and the second voltage-current conversion circuit 170, respectively. The second voltage-current conversion circuit 170 may be connected to the light emitting component 190 and configured to convert the voltage/current from the energy storage and discharge device 180 to a normal operating voltage/current of the light emitting component 190.

The switch status detection circuit 150 may be configured to detect an on/off status of the control switch 120; and when it is detected that the control switch 120 is switched off, control the energy storage and discharge device 180 to provide power to the light emitting component 190. FIG. 1A and FIG. 1B illustrate two variations of how the switch status detection circuit 150 is connected in a time-delay lighting circuit.

As shown in FIG. 1A, the switch status detection circuit 150 may connect to the output end of the AC-DC converter 130. The switch status detection circuit 150 may be configured to determine the on/off status of the control switch 120 by determining whether the AC-DC converter 130 outputs a DC voltage. When no voltage (or a voltage lower than a preset threshold value) is detected at the AC-DC converter 130, the switch status detection circuit 150 may output a switch-on signal to the second voltage-current conversion circuit 170. After receiving the switch-on signal outputted by the switch status detection circuit 150, the second voltage-current conversion circuit 170 may be configured to control the energy storage and discharge device 180 to provide a voltage and/or current satisfying preset conditions to the light emitting component 190.

As shown in FIG. 1B, the switch status detection circuit 150 may connect to the control switch 120. The switch status detection circuit 150 may be configured to determine the on/off status of the control switch 120 according to voltage/current exerted on one or more circuit components (e.g., resistors) by the external power source 110. When the RMS value of detected voltage is greater than a preset threshold, the switch status detection circuit 150 may determine that the control switch 120 is switched on and prevent the energy storage and discharge device 180 from discharging. When no voltage (or a voltage lower than a preset threshold value) is detected, the switch status detection circuit 150 may output a switch-on signal to the second voltage-current conversion circuit 170. After receiving the switch-on signal outputted by the switch status detection circuit 150, the second voltage-current conversion circuit 170 may be configured to control the energy storage and discharge device 180 to provide a voltage and/or current satisfying preset conditions to the light emitting component 190. In other words, the second voltage-current conversion circuit 170 may be configured to, upon receiving the switch-on signal, convert the current/voltage inputted from the energy storage and discharge device 180 to voltage/current satisfying working conditions of the light emitting component 190, and output the converted voltage/current to the light emitting component 190. Further, the second voltage-current conversion circuit 170 may be configured to, upon receiving a switch-off signal, stop converting the current/voltage inputted from the energy storage and discharge device 180, and stop outputting the converted voltage/current to the light emitting component 190.

Referring to FIG. 1A and FIG. 1B, the output end of the AC-DC converter 130 may also connect to the charging controller 160. The charging controller 160 may be configured to charge the energy storage and discharge device 180 when the AC-DC converter 130 outputs a DC voltage.

In one embodiment, the energy storage and discharge device 180 may be a super-capacitor. The super-capacitor may be a double-layer electric capacitor, whose ultra-high capacity may be obtained by utilizing a double-layer electric structure consisted of active carbon porous electrodes and electrolyte. The super-capacitor may be charged and discharged for hundreds of thousands of times, and a charging/discharging cycle may be fulfilled in several seconds. Accordingly, the time-delay lighting device may be repeatedly used without damage and maintenance, which saves unnecessary cost due to damages that require device replacement and reduces manpower needed by device maintenance. In another embodiment, the energy storage and discharge device 180 may be a rechargeable battery.

In one embodiment, when a user switches on the control switch 120 (i.e., close the control switch 120), the external power source 110 may supply power to the time-delay lighting circuit. An AC current (220V at 50 Hz) provided by the external power source 110 may be converted to a DC current with a relatively high voltage via the AC-DC converter 130. The DC current with a relatively high voltage may be converted to a DC current with a relatively low voltage via the first voltage-current conversion circuit 140, thus supplying operating power to the light emitting component 190. The DC current with a relatively high voltage may also be converted to a relatively low voltage that satisfies charging conditions of the energy storage and discharge device 180 via the charging controller 160, thus charging the energy storage and discharging device 180. Further, the switch status detection circuit 150 may detect that the control switch 120 is switched on (e.g., a DC current with a relatively high voltage outputted by the AC-DC converter 130), indicating the external power source 110 supplies power to the light emitting component 190, and thus, the energy storage and discharge device 180 may not discharge. At this time, the switch status detection circuit 150 may output a switch-off signal to the second voltage-current conversion circuit 170, thus preventing the energy storage and discharge device 180 from discharging.

When the user switches off the control switch 120, the external power source 110 may no longer supply power to the light emitting component 190. Correspondingly, the AC-DC converter 130 may no longer output a DC current with a relatively high voltage. The switch status detection circuit 150 may detect that the control switch 120 is switched-off (e.g., no DC current with a relatively high voltage outputted by the AC-DC converter 130 is detected), and thus, may output a switch-on signal to the second voltage-current conversion circuit 170. That is, a circuit between the energy storage and discharge device 180 and the light emitting component 190 may be conducted to allow the energy storage and discharge device 180 to discharge. Simultaneously, the second voltage-current conversion circuit 170 may convert a voltage/current provided by the energy storage and discharge device 180 to the voltage/current satisfying working conditions of the light emitting component 190, thus supplying power to the light emitting component 190 and realizing time-delay lighting after the control switch 120 is switched off.

Further, during a process that the energy storage and discharge device 180 discharges to supply power to the light emitting component 190, the switch status detection circuit 150 may also be configured to output a switch-off signal to the second voltage-current conversion circuit 170 when an output voltage of the energy storage and discharge device 180 is detected to be lower than a preset value. The second voltage-current conversion circuit 170 may be further configured to switch off the power supply switch after receiving the switch-off signal. By then, the light emitting component 190 may no longer emit lights.

The time-delay lighting circuit provided by the present disclosure may include an AC-DC converter, a first voltage-current conversion circuit (e.g., a high-to-low voltage converter), a switch status detection circuit, a second voltage-current conversion circuit, a charging controller, and an energy storage and discharge device. The AC-DC converter may connect to the high-to-low voltage converter, and the high-to-low voltage converter may connect to the light emitting component. The AC-DC converter may also connect to the switch status detection circuit and the charging controller, respectively. The switch status detection circuit may also connect to the second voltage-current conversion circuit and the energy storage and discharge device, respectively. The energy storage and discharge device may also connect to the charging controller and the second voltage-current conversion circuit, respectively.

The second voltage-current conversion circuit may also connect to the light emitting component, and the switch status detection circuit may be used to detect the on/off status of the control switch. If the control switch is switched off, the switch status detection circuit may output a switch-on signal to the second voltage-current conversion circuit. After receiving the switch-on signal outputted by the switch status detection circuit, the second voltage-current conversion circuit may be used to switch on the power supply switch, thus controlling the energy storage and discharge device to provide a voltage and/or current satisfying preset conditions to the light emitting component. The charging controller may be used to charge the energy storage and discharge device when the AC-DC converter outputs a DC voltage, thus realizing time-delay lighting after the control switch is switched off. By controlling the energy storage and discharge device to discharge, time-delay lighting may be realized, thus avoiding the occurrence of potential safety issues.

Figure 2:
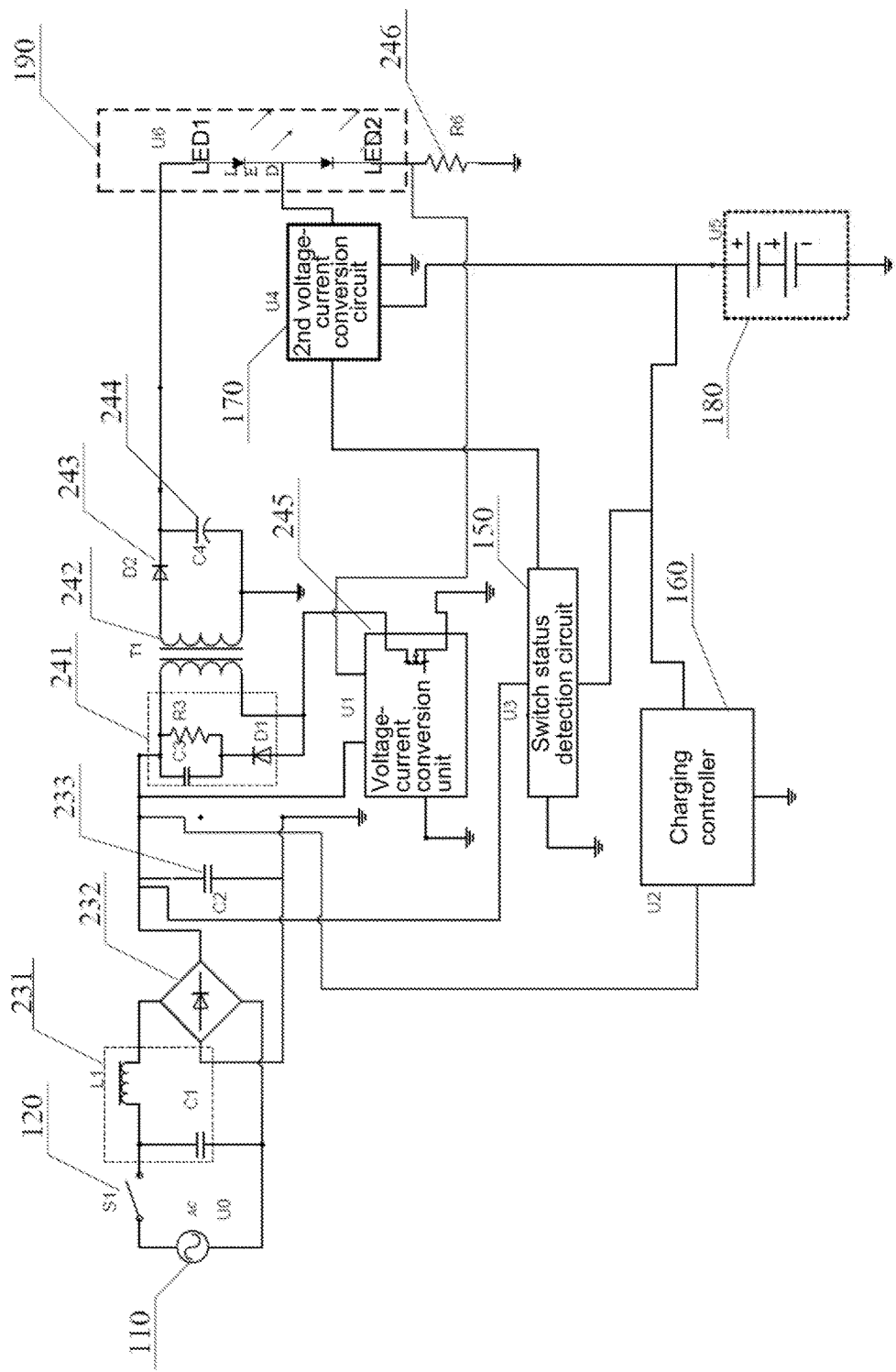
FIG. 2 illustrates another exemplary time-delay lighting circuit consistent with the disclosed embodiments.

FIG. 2 illustrates another exemplary time-delay lighting circuit. As shown in FIG. 1A and FIG. 2, based on the embodiment illustrated in FIG. 1A, this embodiment provides further descriptions of the AC-DC converter 130.

Specifically, the AC-DC converter 130 may include a filter circuit 231, a rectifier bridge 232, and a second capacitor 233 (i.e., C2). The filter circuit 231 may include a first inductor L1 and a first capacitor C1. The first capacitor C1 may connect to an external power source in parallel, a first end of the first inductor L1 may connect to a first end of the first capacitor C1, a second end of the first inductor L1 may connect to a first AC input end of the rectifier bridge 232, and a second AC input end of the rectifier bridge 232 may connect to a second end of the first capacitor C1. A first end of the C2 capacitor 233 may connect to a first DC output end of the rectifier bridge 232 and an input end of the first voltage-current conversion circuit 140 at a first connection point. A second end of the second capacitor 233 may connect to a second DC output end of the rectifier bridge 232, and further connect to ground.

In one embodiment, the AC-DC converter 130 may send an AC current (220V at 50 Hz) provided by the external power source 110 to the filter circuit 231 to filter out interference of other high-frequency signals from the external power source 110. The 220V/50 Hz AC current may then undergo bridge-type rectification of the rectifier bridge 232 to obtain a rectified pulsating direct current. The rectified pulsating direct current may be filtered by the second capacitor 233 to become a smooth direct current for output, thus completing the conversion from an alternating current to a direct current.

In some embodiments, the AC-DC converter 130 may refer to the rectifier bridge 232. The filter circuit 231 and the second capacitor 233 may be considered as filtering components of the time-delay lighting circuit.

Referring to FIG. 1A and FIG. 2, based on the above embodiments, this embodiment provides detailed descriptions on a first implementation of the first voltage-current conversion circuit 140.

As shown in FIG. 2, the first implementation of the first voltage-current conversion circuit 140 may include an absorbing circuit 241, a transformer 242, a diode 243 (i.e., D2), a capacitor 244 (i.e., C4), a voltage-current conversion unit 245, and a resistor 246 (i.e., R6). The absorbing circuit 241 may connect to an output end of the AC-DC converter 130, a first input end of the transformer 242, and a first input end of the voltage-current conversion unit 245, respectively. A first output end of the transformer 242 may connect to an anode of the D2 diode 243, and a second output end of the transformer 242 may connect to a second end of the C4 capacitor 244 and further connect to ground. A cathode of the D2 diode 243 may connect to a first end of the C4 capacitor 244, and may also be used to connect to a first end of the light emitting component 190. A first output end of the voltage-current conversion unit 245 may connect to a first end of the R6 resistor 246, and the first output end of the voltage-current conversion unit 245 may also be used to connect to a second end of the light emitting component 190. A second output end of the voltage-current conversion unit 245 may connect to ground, and a source (S) electrode of a MOS transistor in the voltage-current conversion unit 245 may connect to ground. A second end of the R6 resistor 246 may connect to ground.

The absorbing circuit 241 may include a capacitor C3, a resistor R3, and a diode D1. The capacitor C3 may connect to the resistor R3 in parallel. A first end of the capacitor C3, a first end of the resistor R3 may connect to the output end of the AC-DC converter 130, a first input end of the transformer 242, and a first input end of the voltage-current conversion unit 245 at the first connecting point, respectively. A second end of the capacitor C3, a second end of the resistor R3 may connect to the cathode of the diode D1, respectively. An anode of the diode D1 may connect to a second input end of the transformer 242 and a drain (D) source of the MOS transistor in the voltage-current conversion unit 245, respectively.

In some embodiments, the voltage-current conversion unit 245 may include an AC-DC controller. The first voltage-current conversion circuit 140 may use a DC current with a relatively high voltage outputted by the AC-DC converter 130 as an input, and convert the DC current with a relatively high voltage to a DC current with a relatively low voltage via the transformer 242. Because the transformer 242 may be used for voltage conversion of an AC current, the DC current with a relatively high voltage may be converted to an AC current before conversion at the transformer 242 (e.g., by the AC-DC controller), and an AC current with a relatively low voltage may be obtained after conversion at the transformer 242. After rectification using the D2 diode 243, the AC current with a relatively low voltage may become a rectified pulsating direct current. The rectified pulsating direct current is further filtered by the C4 capacitor 244, and a smooth direct current with a relatively low voltage may be obtained, thus supplying power to the light emitting component 190.

To protect the MOS transistor in the voltage-current conversion unit 245 from breakdown, the DC current with a relatively high voltage outputted by the AC-DC converter 130 may pass the absorbing circuit 241 and then input to the drain (D) electrode of the MOS transistor. An output end of the voltage-current conversion unit 245 may connect to the R6 resistor 246 and provide a feedback current to the voltage-current conversion unit 245. When the feedback current is larger than a current that supports normal operation of the light emitting component 190, the voltage-current conversion unit 245 may reduce voltage output, and when the feedback current is smaller than the current that supports the normal operation of the light emitting component 190, the voltage-current conversion unit 245 may increase the voltage output, thus providing a stable and normal working current/voltage to the light emitting component 190. Accordingly, the first voltage-current conversion circuit 140 may convert a direct current with a relatively high voltage to a direct current with a relatively low voltage. Further, the direct current with a relatively low voltage may be adjusted within a range compatible to the working current of the light emitting component 190.

Further, the light emitting component 190 may include LED1 and LED2 connected in series. A first end of LED1 may connect to the cathode of the D2 diode 243 (i.e., the first end of the light emitting component 190). A first end of LED2 (i.e., the second end of the light emitting component 190) may connect to the resistor R6, and a second end of LED2 may connect to a second end of LED1 and the second voltage-current conversion unit 170. When the control switch 120 is closed, the first voltage-current conversion circuit 140 is configured to convert the voltage/current at its input end (e.g., from the AC-DC converter) to an operating voltage/current for the light emitting component 190 at its output end, and both LED1 and LED2 emit light accordingly. When the control switch 120 is opened, the second voltage-current conversion circuit 170 is configured to convert the voltage/current at its input end (e.g., from the energy storage and discharge device 180) to an operating voltage/current for the light emitting component 190 at its output end, and LED2 emits light accordingly.

Figure 3:
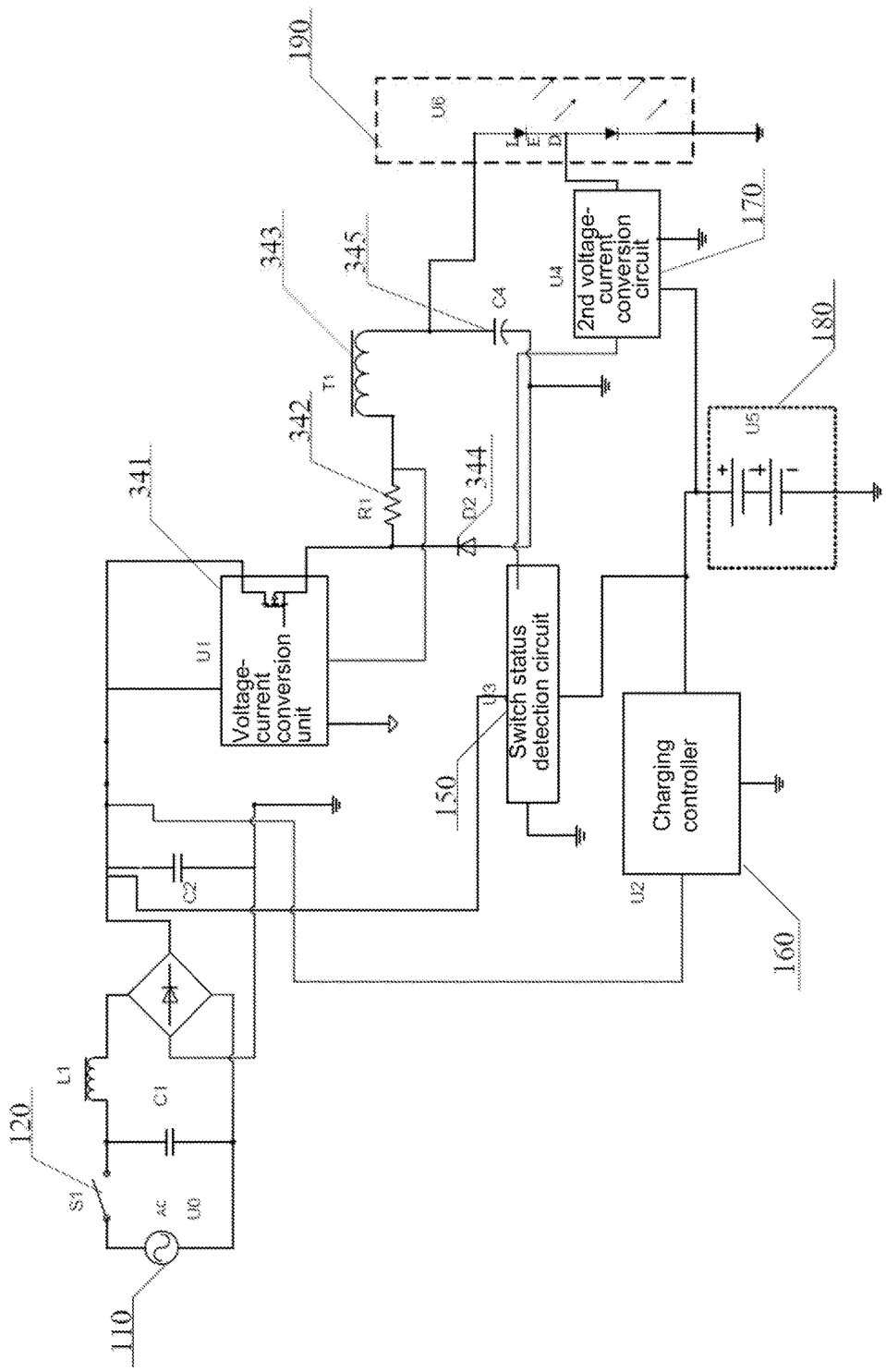
FIG. 3 illustrates another exemplary time-delay lighting circuit consistent with the disclosed embodiment.

FIG. 3 illustrates another time-delay lighting circuit. Referring to FIG. 1A and FIG. 3, based on the embodiment in FIG. 1A, this embodiment may provide further descriptions a second implementation of the first voltage-current conversion circuit 140. The components of the AC-DC converter 130 in this embodiment may refer to the descriptions in the embodiment illustrated in FIG. 2, and thus is not repeated in this embodiment.

As shown in FIG. 3, the second implementation of the first voltage-current conversion circuit 140 may include a voltage-current conversion unit 341, a resistor 342 (i.e., R1), an inductor 343 (i.e., T1), a diode 344 (i.e., D2), and a capacitor 345 (i.e., C4).

An input end of the voltage-current conversion unit 341 may connect to a drain (D) electrode of the MOS transistor in the voltage-current conversion unit 341 at a first connection point. A source (S) electrode of the MOS transistor in the voltage-current conversion unit 341 may connect to a first end of the R1 resistor 342 and a cathode of the D2 diode 344, respectively. A first output end of the voltage-current conversion unit 341 may connect to a second end of the R1 resistor 342 and an input end of the inductor 343, respectively. A second output end of the voltage-current conversion unit 341 may connect to ground. An output end of the inductor 343 may connect to a first end of the C4 capacitor 345, and may be used to connect to the first end of the light emitting component 190. The anode of the D2 diode 344 may connect to a second end of the C4 capacitor 345, and may further connect to ground.

In this embodiment, the MOS transistor in the voltage-current conversion unit 341 may be used as a switch. Specifically, when the control switch is closed, the MOS transistor may be configured to turn on and off at a certain frequency. In one cycle, when the MOS transistor is turned on, the T1 inductor 343 may store energies as an inductor, and the C4 capacitor 345 may be charged. When the MOS transistor is turned off, the T1 inductor 343 may not show a sudden change in energy, the voltage direction may revert, and the T1 inductor 343 may start to discharge, thus supplying a voltage to the light emitting component 190.

Further, the voltage-current conversion unit 341 may be configured to monitor a current/voltage on the R1 resistor 342 and dynamically adjust output accordingly. The voltage on R1 resistor 342 can reflect an operation current on the light emitting component 190. For example, when the voltage of the R1 resistor 342 is higher than a first preset threshold, the voltage-current conversion unit 341 may reduce current output to the light emitting component 190; when the voltage of the R1 resistor 342 is lower than a second preset threshold, the voltage-current conversion unit

341 may increase current output to the light emitting component 190. The current output may refer to an average output. The voltage-current conversion unit 341 may adjust the current output by, for example, changing the frequency of the MOS transistor, or by pulse-width modulation, etc. In this way, the voltage-current conversion unit 341 can provide the current/voltage satisfying working conditions of the light emitting component 190.

Figure 4:
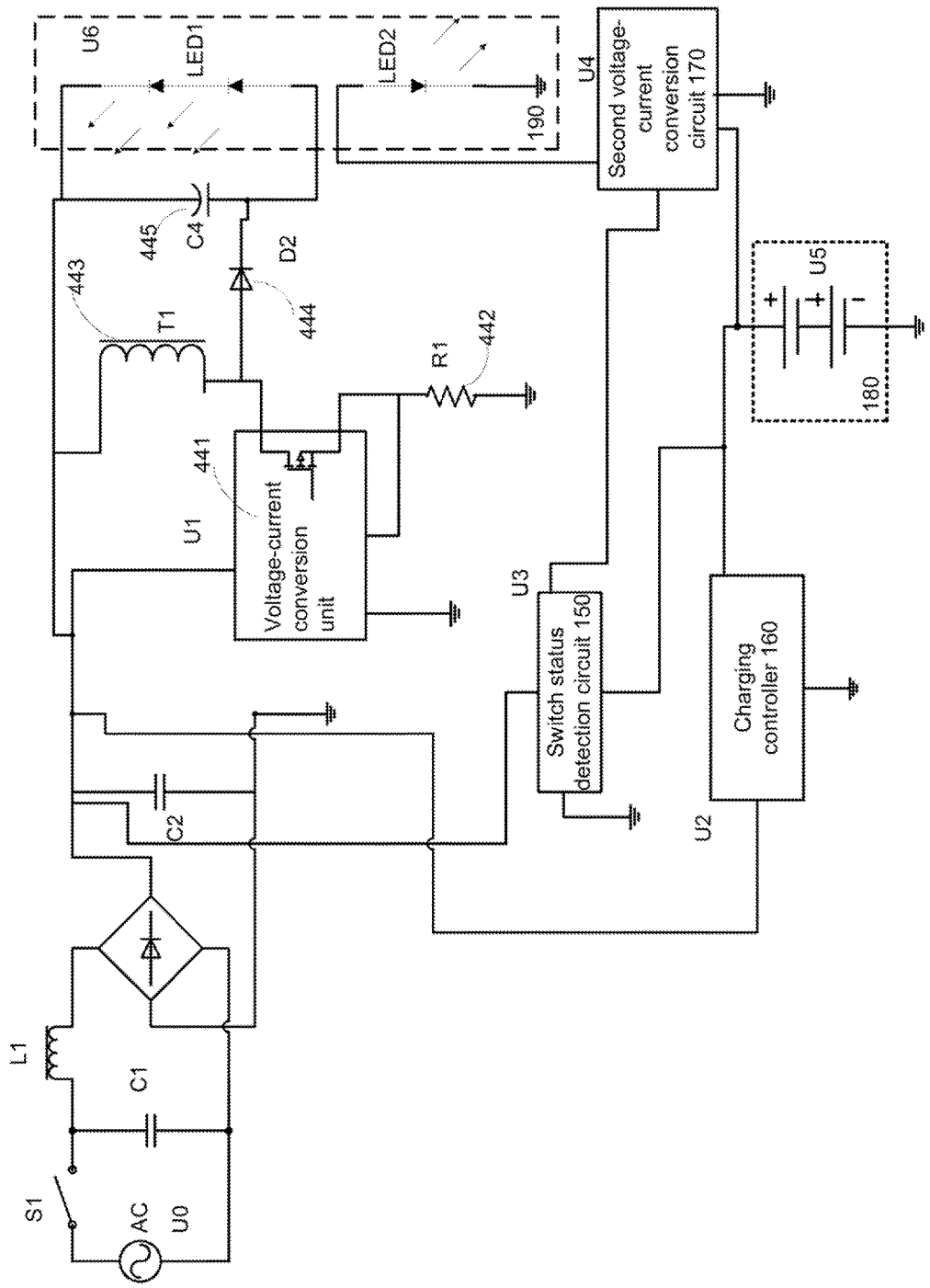
FIG. 4 illustrates another exemplary time-delay lighting circuit consistent with the disclosed embodiment.

FIG. 4 illustrates another time-delay lighting circuit. Referring to FIG. 1A and FIG. 4, based on the embodiment in FIG. 1A, this embodiment may provide further descriptions a third implementation of the first voltage-current conversion circuit 140. The components of the AC-DC converter 130 in this embodiment may refer to the descriptions in the embodiment illustrated in FIG. 2, and thus is not repeated in this embodiment.

As shown in FIG. 4, the third implementation of the first voltage-current conversion circuit 140 may include a voltage-current conversion unit 441, a resistor 442 (i.e., R1), an inductor 443 (i.e., T1), a diode 444 (i.e., D2), and a capacitor 445 (i.e., C4).

An input end of the voltage-current conversion unit 441 may connect to a first end of the T1 inductor 443 and a second end of the C4 capacitor 445 at a first connection point, respectively. A drain (D) electrode of the MOS transistor in the voltage-current conversion unit 441 may connect to a second end of the T1 inductor 443, and an anode of the D2 diode 444, respectively. An output end of the voltage-current conversion unit 441 may connect to a source (S) electrode of the MOS transistor in the voltage-current conversion unit 441, and a first end of the R1 transistor 442, respectively. A second output end of the voltage-current conversion unit 441 may connect to ground. A second end of the R1 resistor 442 may connect to the ground. A cathode of the D2 diode 444 may connect to a first end of the C4 capacitor 445.

The light emitting component 190 may include LED1 and LED2. LED1 may be connected in parallel with the C4 capacitor 445 and emit light when the control switch is closed. LED2 may be connected to the second voltage-current conversion circuit and emit light when the control switch is opened.

In this embodiment, the MOS transistor in the voltage-current conversion unit 441 may be used as a switch. Specifically, when the control switch is closed, the MOS transistor may be configured to turn on and off at a certain frequency. In one cycle, when the MOS transistor is turned on, the T1 inductor 443 may store energies as an inductor, and the C4 capacitor 445 may be charged. When the MOS transistor is turned off, the T1 inductor 443 may not show a sudden change in energy, the voltage direction may revert, and the T1 inductor 443 may start to discharge, thus supplying a transient voltage/current to the light emitting component 190. Further, the voltage-current conversion unit 441 may be configured to adjust output according to feedback provided by the R1 resistor 442.

Figure 5:
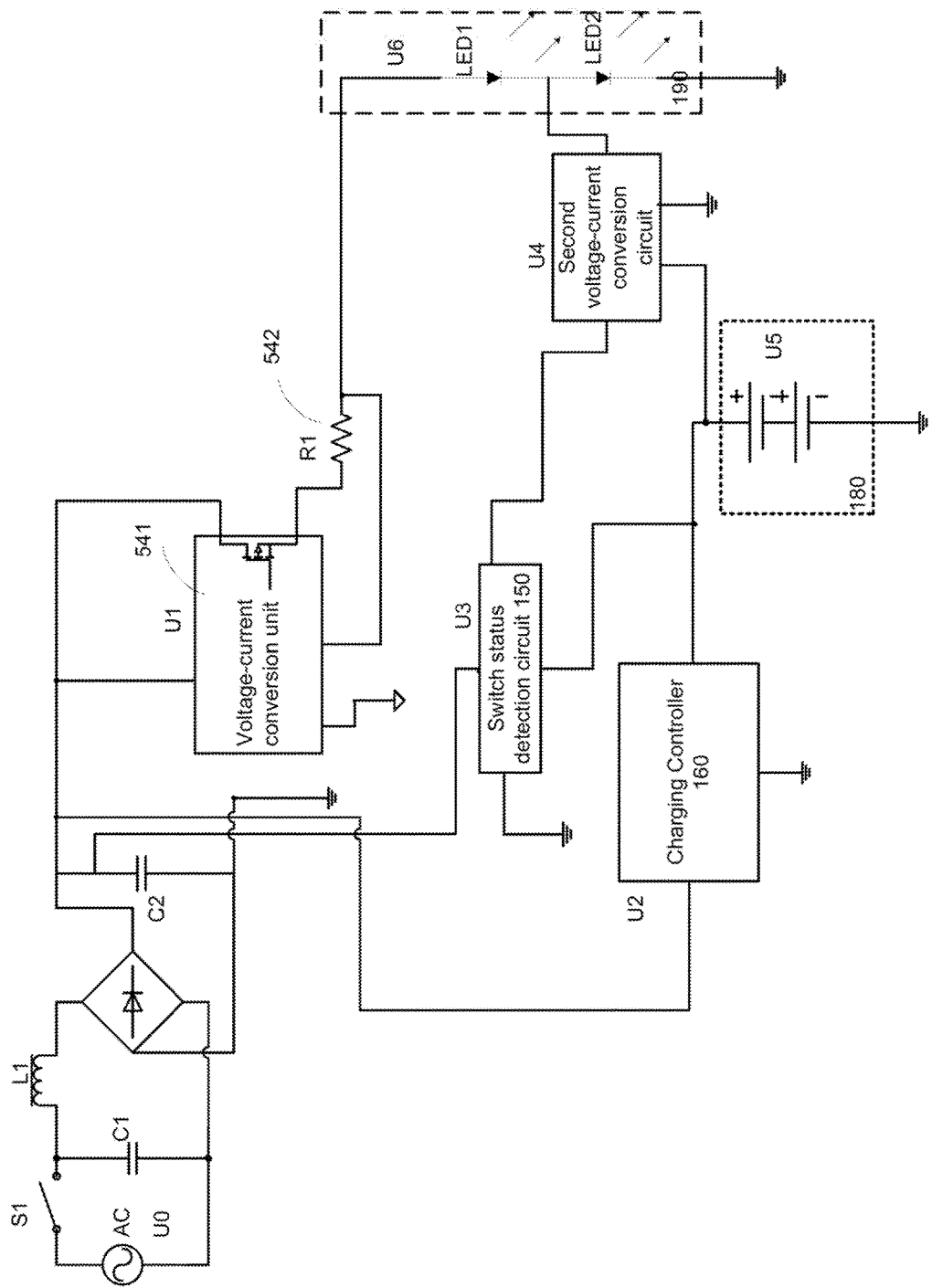
FIG. 5 illustrates another exemplary time-delay lighting circuit consistent with the disclosed embodiment.

FIG. 5 illustrates another time-delay lighting circuit. Referring to FIG. 1A and FIG. 5, based on the embodiment in FIG. 1A, this embodiment may provide further descriptions a fourth implementation of the first voltage-current conversion circuit 140. The components of the AC-DC converter 130 in this embodiment may refer to the descriptions in the embodiment illustrated in FIG. 2, and thus is not repeated in this embodiment.

As shown in FIG. 5, the fourth implementation of the first voltage-current conversion circuit 140 may include a voltage-current conversion unit 541, and a resistor 542 (i.e., R1).

An input end of the voltage-current conversion unit 541 may connect to a drain (D) electrode of the MOS transistor in the voltage-current conversion unit 541 at a first connection point. A source (S) electrode of the MOS transistor in the voltage-current conversion unit 541 may connect to a first end of the R1 resistor 542. A first output end of the voltage-current conversion unit 541 may connect to a second end of the R1 resistor 542 and the light emitting component 190, respectively. A second output end of the voltage-current conversion unit 541 may connect to ground.

Comparing to the previously described implementations, the fourth implementation is linear and does not have an energy storage process introduced by an inductor. The voltage-current conversion unit 541 may monitor a current flowing through the R1 resistor 542 and the light emitting component 190. When the current is higher, the voltage drop produced by the MOS transistor may be adjusted higher, such feedback loop may provide a desired steady operating voltage/current to the light emitting component 190.

Figure 6:
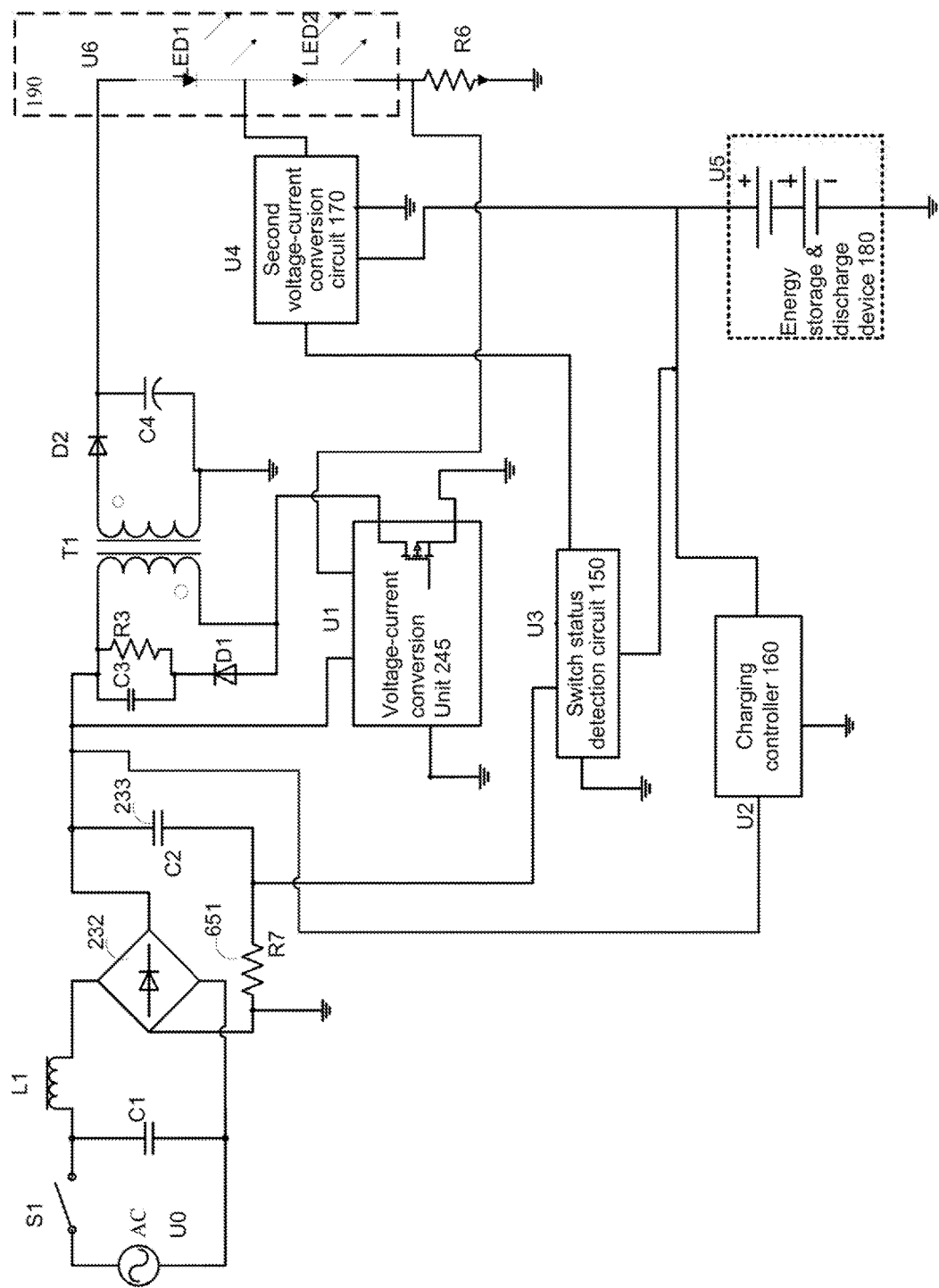
FIG. 6 illustrates another exemplary time-delay lighting circuit consistent with the disclosed embodiment.

FIG. 6 illustrates another time-delay lighting circuit. Referring to FIG. 1A, FIG. 2 and FIG. 6, based on the embodiment in FIG. 2, this embodiment may provide a second implementation for detecting the switch status. As shown in FIG. 6, the time-delay lighting circuit may further include a resistor 651 (i.e., R7). A first end of the R7 resistor 651 may connect to an input end of the switch status detection circuit 150, and the second end of the C2 capacitor 233, respectively. A first end of the R7 resistor 651 may connect to the second DC output end of the rectifier bridge 232, and further connect to ground. The first end of the C2 capacitor 233 may connect to the first DC output end of the rectifier bridge 232. Other components of the time-delay lighting circuit shown in FIG. 6 may connect in a similar manner as the time-delay lighting circuit described according to FIG. 2.

In one embodiment, the switch status detection circuit 150 may be configured to determine the status of the control switch 120 based on the voltage/current on the R7 resistor 651. When the control switch is closed, a current may flow through the R7 resistor 651. Accordingly, the switch status control circuit 150 may detect a voltage or current higher than a preset threshold (e.g., 0) and control the second voltage-current conversion circuit 170 to turn off. When the control switch is open, no current flows through the R7 resistor 651, and the switch status control circuit 150 may detect that the voltage/current of R7 is lower than a threshold (e.g., for a set time period). Accordingly, the switch status control circuit 150 may control the second voltage-current conversion circuit 170 to provide power to the light emitting component 190 (e.g., LED2).

Figure 7:
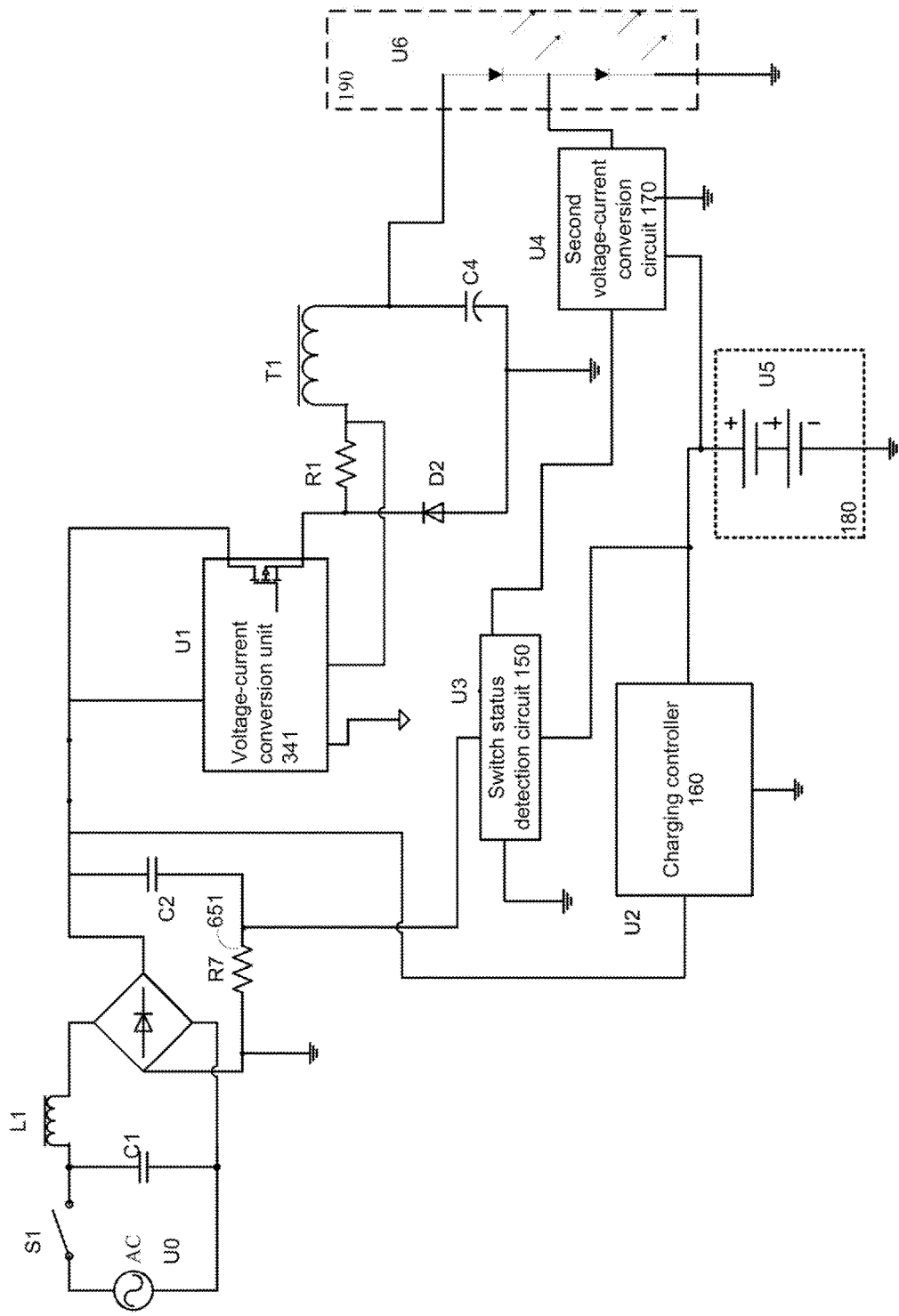
FIG. 7 illustrates another exemplary time-delay lighting circuit consistent with the disclosed embodiment.

FIG. 7 illustrates another time-delay lighting circuit. Referring to FIG. 3, FIG. 6, and FIG. 7, based on the embodiment in FIG. 3, this embodiment provides the second implementation for detecting the switch status. The time-delay lighting circuit may further include a resistor 651 (i.e., R7). The R7 resistor 651 may be connected into the circuit in a similar manner as the embodiment shown in FIG. 6. Further, the switch status detection circuit 150 may determine the status of the switch by monitoring the voltage/current on the resistor R7. Other components of the time-delay lighting circuit shown in FIG. 7 may connect in a similar manner as the time-delay lighting circuit described according to FIG. 3.

Figure 8:
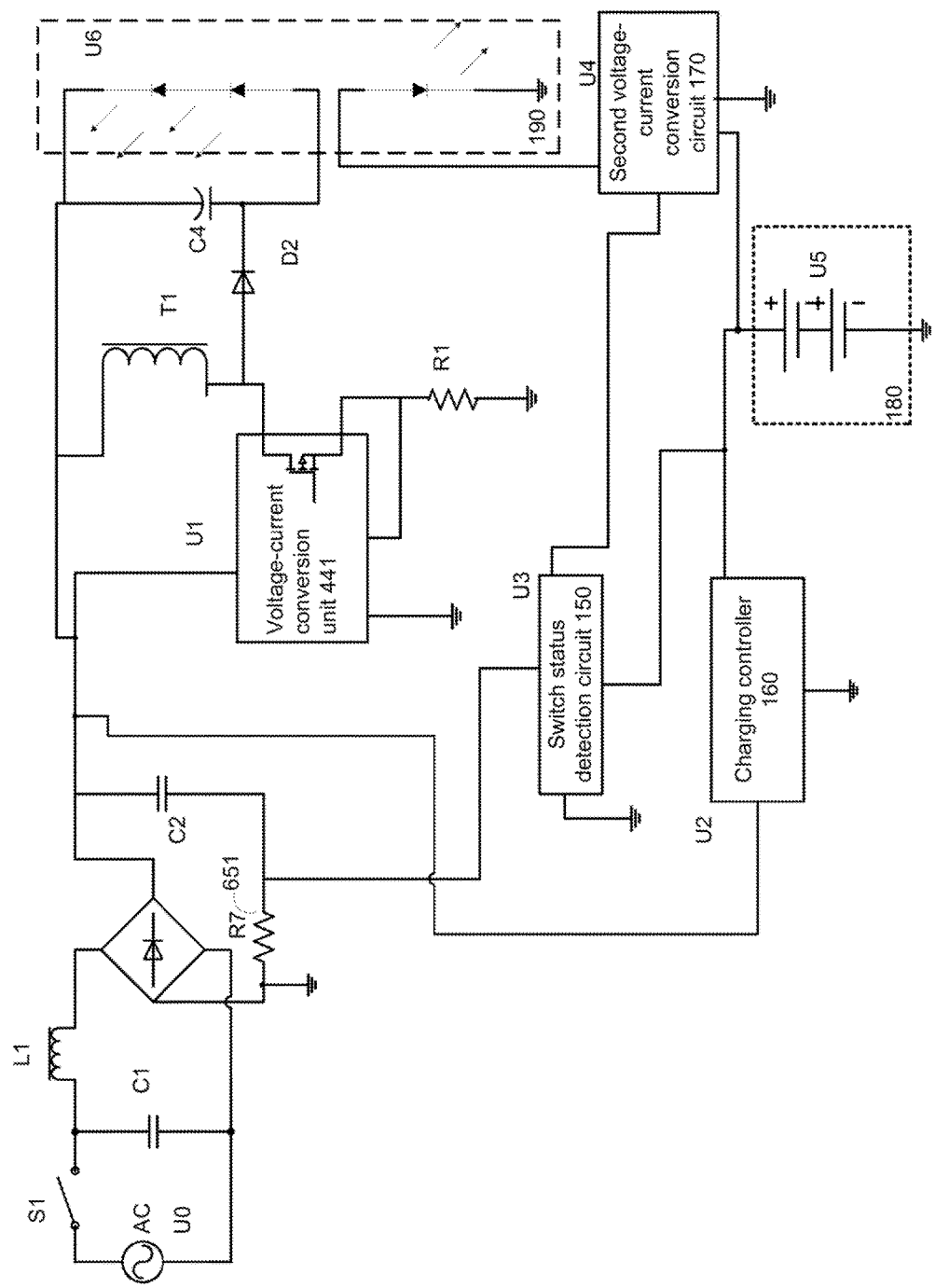
FIG. 8 illustrates another exemplary time-delay lighting circuit consistent with the disclosed embodiment.

FIG. 8 illustrates another time-delay lighting circuit. Referring to FIG. 4, FIG. 6, and FIG. 8, based on the embodiment in FIG. 4, this embodiment provides the second implementation for detecting the switch status. The time-delay lighting circuit may further include a resistor 651 (i.e., R7). The R7 resistor 651 may be connected into the circuit in a similar manner as the embodiment shown in FIG. 6. Further, the switch status detection circuit 150 may determine the status of the switch by monitoring the voltage/current on the resistor R7. Other components of the time-delay lighting circuit shown in FIG. 8 may connect in a similar manner as the time-delay lighting circuit described according to FIG. 4.

Figure 9:
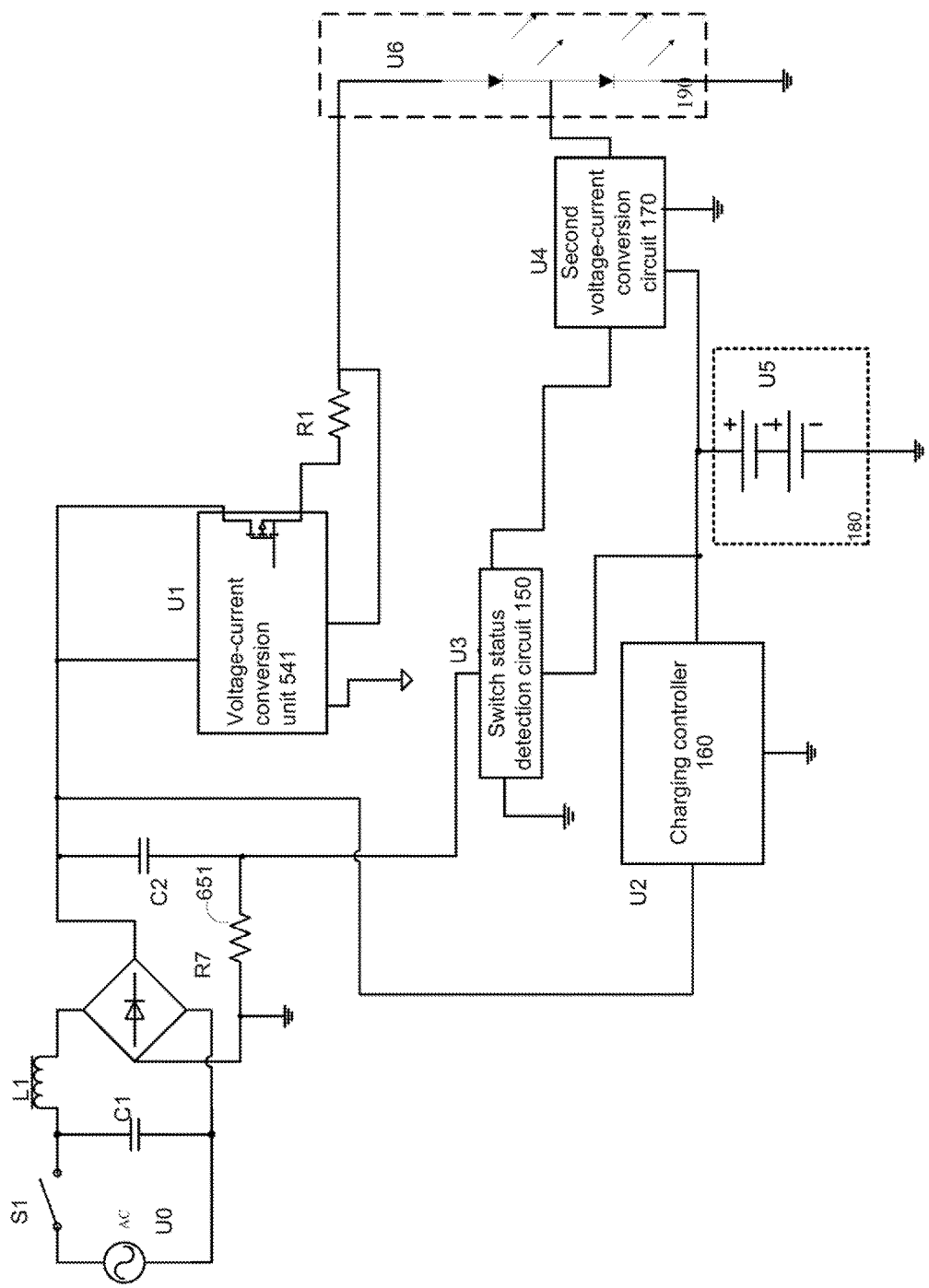
FIG. 9 illustrates another exemplary time-delay lighting circuit consistent with the disclosed embodiment.

FIG. 9 illustrates another time-delay lighting circuit. Referring to FIG. 5, FIG. 6, and FIG. 9, based on the embodiment in FIG. 5, this embodiment provides the second implementation for detecting the switch status. The time-delay lighting circuit may further include a resistor 651 (i.e., R7). The R7 resistor 651 may be connected into the circuit in a similar manner as the embodiment shown in FIG. 6. Further, the switch status detection circuit 150 may determine the status of the switch by monitoring the voltage/current on the resistor R7. Other components of the time-delay lighting circuit shown in FIG. 9 may connect in a similar manner as the time-delay lighting circuit described according to FIG. 5.

Figure 10:
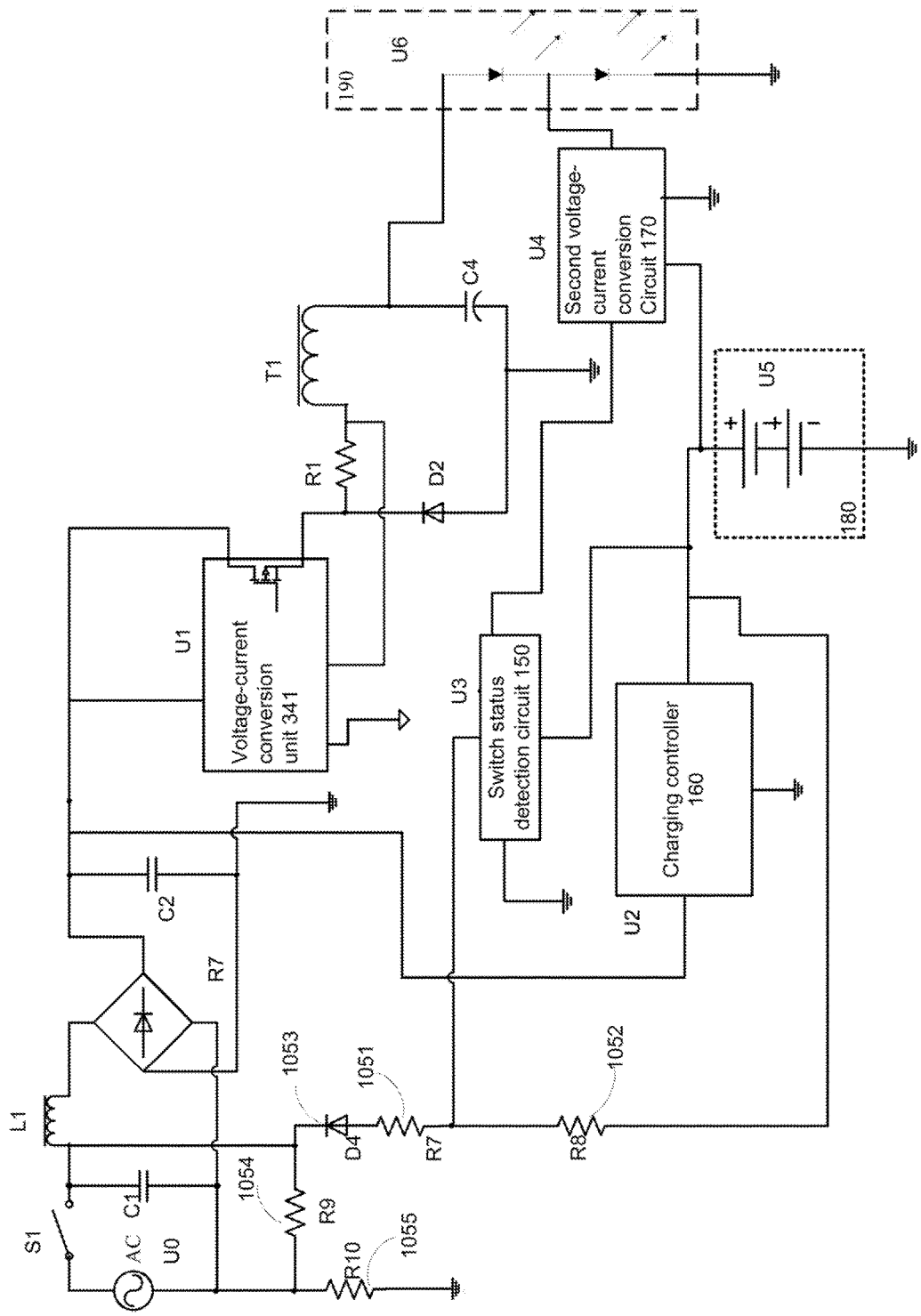
FIG. 10 illustrates another exemplary time-delay lighting circuit consistent with the disclosed embodiment.

FIG. 10 illustrates another time-delay lighting circuit. Referring to FIG. 1B, FIG. 3 and FIG. 10, based on the embodiment in FIG. 3, this embodiment provides a third implementation for detecting the switch status. The time-delay lighting circuit may further include a resistor 1051 (i.e., R7), a resistor 1052 (i.e., R8), a diode 1053 (i.e., D4), a resistor 1054 (i.e., R9), and a resistor 1055 (i.e., R10).

As shown in FIG. 10, a first end of the R8 resistor 1052 may connect to a positive electrode of the energy storage and discharge device 180. A second end of the R8 resistor 1052 may connect to a first end of the R7 resistor 1051, and an input end of the switch status detection circuit 150, respectively. A second end of the R7 resistor 1051 may connect to an anode of the D4 diode 1053. A cathode of the D4 diode 1053 may connect to a first end of the R9 resistor 1054, and a positive electrode of the external power source 110, respectively. A second end of the R9 resistor 1054 may connect to a negative electrode of the external power source 110, and a first end of the R10 resistor 1055, respectively. A second end of the R10 resistor 1055 may connect to the ground.

In one embodiment, the switch status detection circuit 150 may determine the status of the switch by monitoring the voltage on the resistors R7, R9, and R10. When the control switch is open, the energy storage and discharge device 180 may be the power source of the resistors R7-R10 and the diode D4. A voltage drop may occur at the connection point between the second end of resistor R8 and the first end of resistor R7. In other words, resistor R8 may serve as a voltage divider. Accordingly, the switch status detection circuit 150 may detect a voltage lower than the output voltage of the energy storage and discharge device 180. When the control switch is closed, a relatively high voltage may be applied on resistor R9 from the external power source 110. The voltage (e.g., RMS value or peak value) detected by the switch status detection circuit 150 may be close or equal to the output voltage of the energy storage and discharge device 180. In this way, the switch status detection circuit 150 may differentiate the status of the control switch based on the detected voltage and a preset threshold. When the detected voltage is a DC voltage constantly lower than the threshold, the switch status detection circuit 150 may determine that the control switch is open; otherwise, the switch status detection circuit 150 may determine that the control switch is closed.

Other components of the time-delay lighting circuit shown in FIG. 10 may connect in a similar manner as the time-delay lighting circuit described according to FIG. 3. It can be understood that, the third implementation for detecting switch status may be applied to other time-delay lighting circuits, for example, corresponding to FIGS. 2, 4, and 5.

Figure 11:
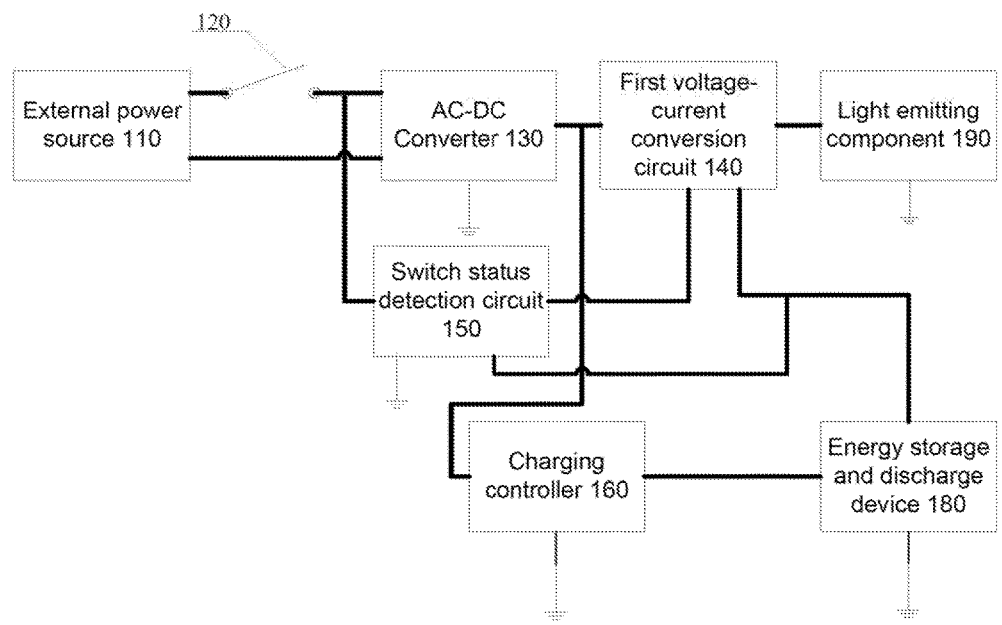
FIG. 11 illustrates another structural diagram of an exemplary time-delay lighting circuit consistent with the disclosed embodiment.

FIG. 11 illustrates another structural diagram of an exemplary time-delay lighting circuit consistent with the disclosed embodiments. As shown in FIG. 11, the time-delay lighting circuit may be configured to control a light emitting component 190, and an input end of the time-delay lighting circuit may connect to an external power source 110 via a control switch 120. The time-delay lighting circuit may include an AC-DC converter 130, a first voltage-current conversion circuit 140, a switch status detection circuit 150, a charging controller 160, and an energy storage and discharge device 180.

Comparing to the structural diagram shown in FIG. 1A and FIG. 1B, the time-delay lighting circuit shown in FIG. 11 has one voltage-current conversion circuit 140. A first input end of the first voltage-current conversion circuit 140 may connect to the AC-DC converter 130. A second input end of the first voltage-current conversion circuit 140 may connect to the switch status detection circuit 150. A third input end of the first voltage-current conversion circuit 140 may connect to the energy storage and discharge device 180. An output end of the first voltage-current conversion circuit 140 may connect to the input end of the light emitting component 190.

In this embodiment, the first voltage-current conversion circuit 140 may be configured to convert an input voltage/current to the working voltage and current of the light emitting component 190. The input voltage/current may be from the external power source 110 via the AC-DC converter 130 when the control switch is switched on, or from the energy storage and discharge device 180 when the switch status detection circuit 150 detects that the control switch is switched off. For example, when the output voltage of the AC-DC converter 130 is similar to the output voltage of the energy storage and discharge device 180, the first voltage-current conversion circuit 140 may be shared to provide a working voltage to the light emitting component 190.

A first end of the switch status detection circuit 150 may be connected to the control switch 120, or an output end of the AC-DC converter 130. A second end of the switch status detection circuit 150 may be connected to the energy storage and discharge device 180. A third end of the switch status detection circuit 150 may be connected to the first voltage-current conversion circuit 140. The switch status detection circuit 150 may be configured to detect the status of the control switch; and when an off status is detected, enable the connection between the energy storage and discharge device 180 and the first voltage-current conversion circuit 140, such that the energy storage and discharge device 180 may provide power to the light emitting component 190.

Figure 12:
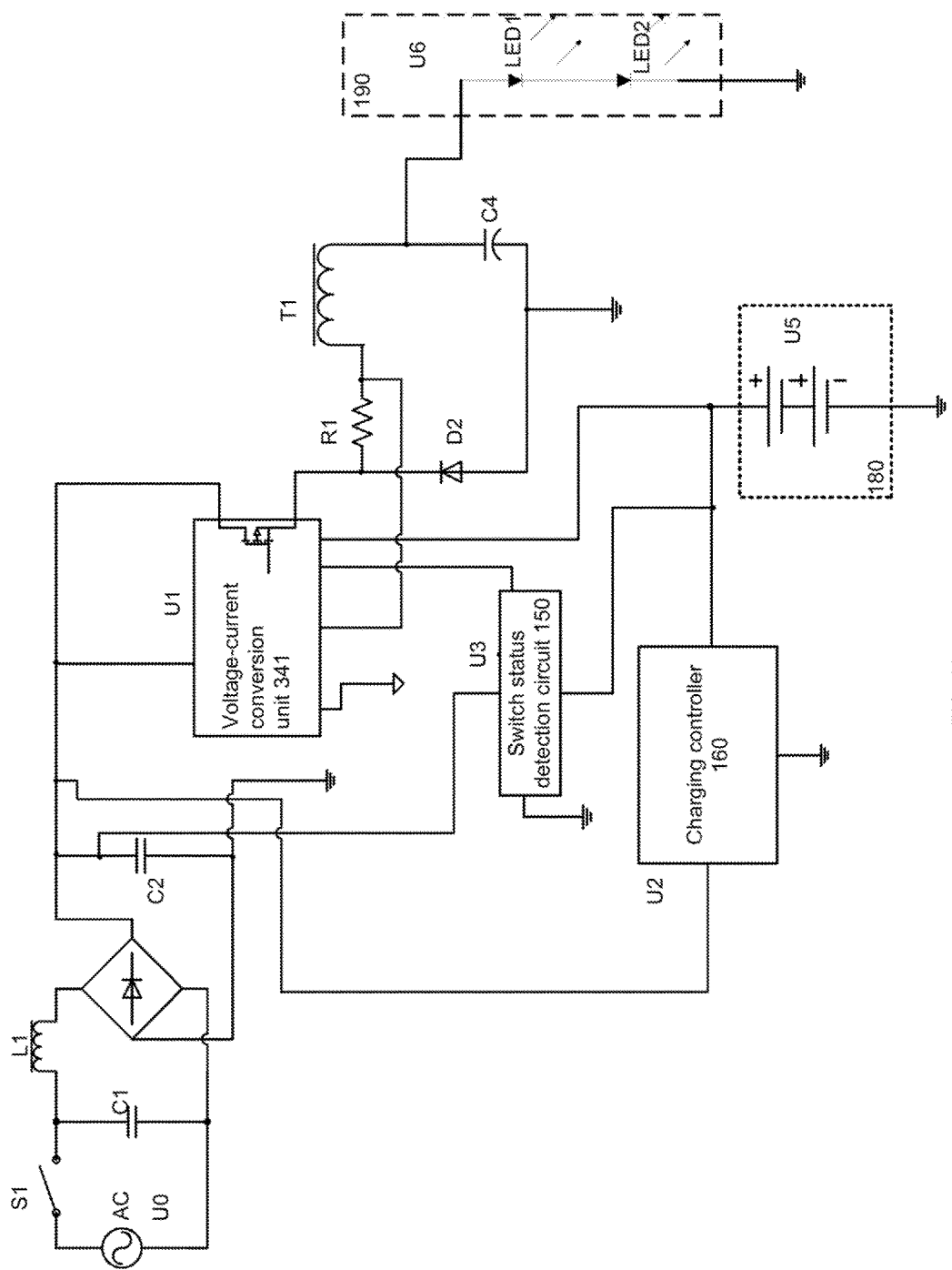
FIG. 12 illustrates another exemplary time-delay lighting circuit consistent with the disclosed embodiment.

FIG. 12 illustrates another exemplary time-delay lighting circuit. Referring to FIG. 11 and FIG. 12, based on the embodiment illustrated in FIG. 11, this embodiment provides one exemplary circuit schematic of a time-delay lighting circuit. As shown in FIG. 12, the second implementation of the first voltage-current conversion circuit 140 (e.g., as described in FIG. 3) may be applied in the time-delay lighting circuit.

Further, the switch status detection circuit 150 may connect to the voltage-current conversion unit 341. The energy storage and discharge device 180 may connect to the voltage-current conversion unit 341. The switch status detection circuit 150 may be configured to detect the status of the control switch (e.g., by determining an output voltage of the AC-DC converter 130); and when an off status is detected, enable the connection between the energy storage and discharge device 180 and the first voltage-current conversion circuit 140, such that the energy storage and discharge device 180 may provide power to the light emitting component 190. Both LED1 and LED2 of the light emitting component 190 may emit light when the control switch 120 is switched off.

It can be understood that, in the embodiments described according to FIG. 2 and FIGS. 4-10, the second voltage-current conversion circuit 170 may be omitted, and the switch status detection circuit 150 and the energy storage and discharge device 180 may be rewired in a similar manner as shown in FIG. 12.

Figure 13:
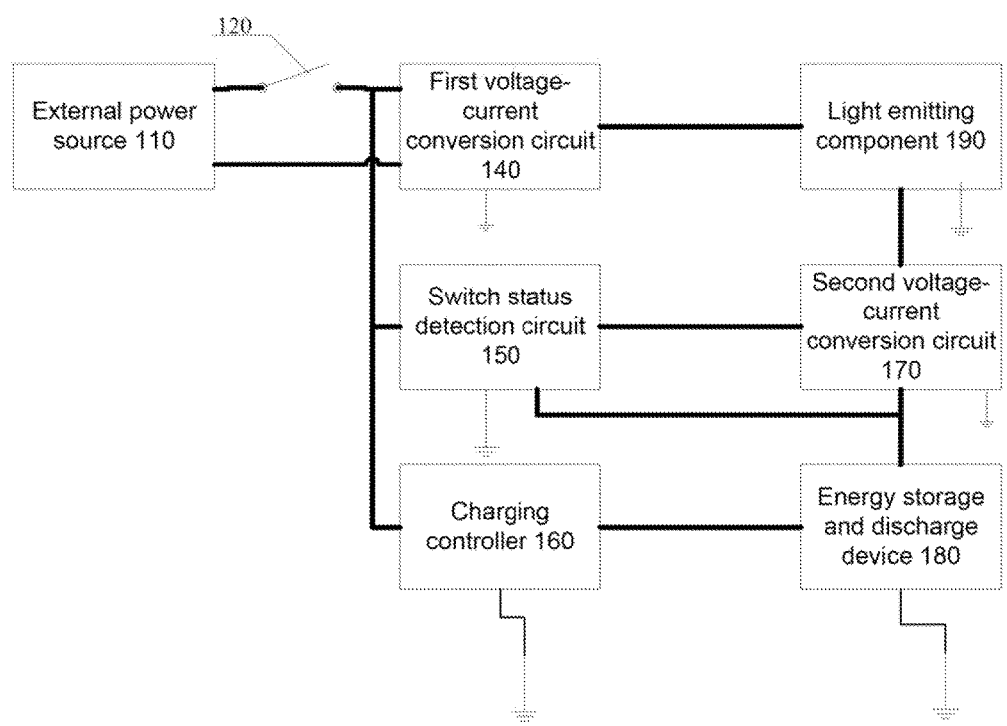
FIG. 13 illustrates another structural diagram of an exemplary time-delay lighting circuit consistent with the disclosed embodiment.

FIG. 13 illustrates another structural diagram of an exemplary time-delay lighting circuit consistent with the disclosed embodiments. As shown in FIG. 13, the time-delay lighting circuit may be configured to control a light emitting component 190, and an input end of the time-delay lighting circuit may connect to an external power source 110 via a control switch 120. The time-delay lighting circuit may include a first voltage-current conversion circuit 140, a switch status detection circuit 150, a charging controller 160, a second voltage-current conversion circuit 170, and an energy storage and discharge device 180.

Comparing to the structural diagram shown in FIG. 1A and FIG. 1B, the AC-DC converter is omitted in the time-delay lighting circuit shown in FIG. 13. A first input end of the first voltage-current conversion circuit 140 may connect to the external power source 110 via the control switch 120. An output end of the first voltage-current conversion circuit 140 may connect to the input end of the light emitting component 190, such that the first voltage-current conversion circuit 140 may convert an input voltage/current (e.g., from the power source 110) to a normal operating voltage/current of the light emitting component 190.

The switch status detection circuit 150 may connect to the second voltage-current conversion circuit 170 and the energy storage and discharge device 180, respectively. The energy storage and discharge device 180 may connect to the charging controller 160 and the second voltage-current conversion circuit 170, respectively. The second voltage-current conversion circuit 170 may be connected to the light emitting component 190 and configured to convert the voltage/current from the energy storage and discharge device 180 to a normal operating voltage/current of the light emitting component 190.

The switch status detection circuit 150 may be connected to the external power source 110 via the control switch 120. The switch status detection circuit 150 may be configured to detect an on/off status of the control switch 120; and when it is detected that the control switch 120 is switched off, control the energy storage and discharge device 180 to provide power to the light emitting component 190.

In some embodiments, the light emitting component 190 may include multiple light emitting diodes (LEDs). The multiple light emitting diodes (LEDs) may form a first LED group and a second LED group. The first voltage-current conversion circuit 140 may be connected to the first LED group and output a first voltage satisfying the working conditions of the first LED group. The second voltage-current conversion circuit 170 may be connected to the second LED group and output a second voltage satisfying the working conditions of the second LED group. In some occasions, the light emitting component 190 may have a different brightness level during the time-delay period when the control switch is switched off compared to the brightness level when the control switch is switched on.

For example, the light emitting component 190 may include two LEDs: LED1 and LED2 connected in series. The first LED group may include both LEDs, and the second LED group may include LED2. That is, similarly as the time-delay lighting circuits shown in FIGS. 2, 3, and 5, when the control switch 120 is switched on, the first LED group (e.g., both two LEDs) may emit light; and when the control switch 120 is switched off, the second LED group (e.g., just LED2) may emit light. Accordingly, the time-delay lighting device may appear to have different brightness level during the time-delay period when the control switch is switched off compared to the brightness level when the control switch is switched on.

In another example, the light emitting component 190 may include two LEDs: LED1 and LED2. LED1 may not be connected to LED2. The first LED group may include LED1, and the second LED group may include LED2. That is, similarly as the time-delay lighting circuits shown in FIG. 4, when the control switch 120 is switched on, the first LED group (e.g., LED 1) may emit light; and when the control switch 120 is switched off, the second LED group (e.g., LED2) may emit light.

Figure 14:
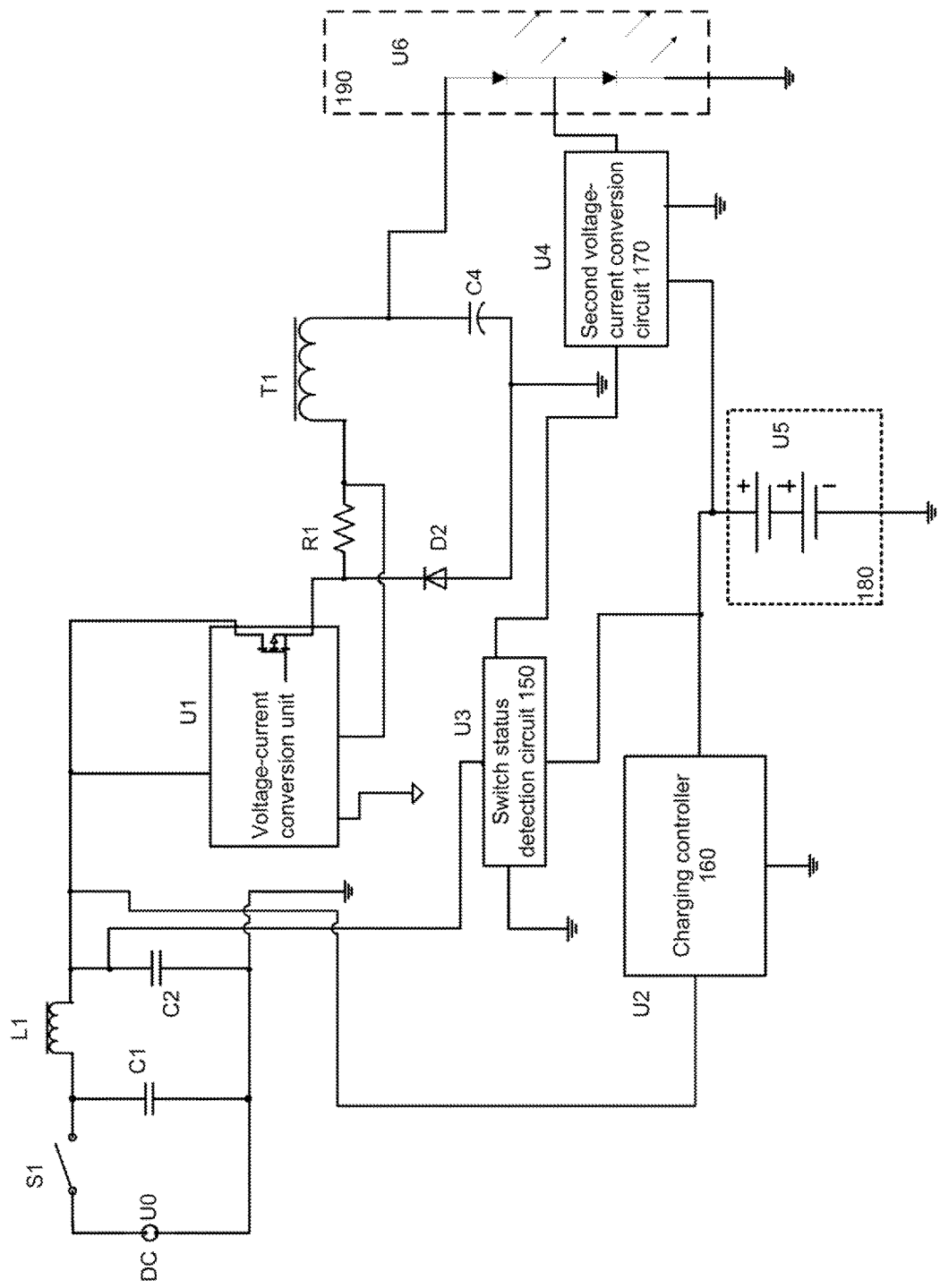
FIG. 14 illustrates another exemplary time-delay lighting circuit consistent with the disclosed embodiment.

FIG. 14 illustrates another exemplary time-delay lighting circuit. Referring to FIG. 3 and FIG. 13, based on the embodiment illustrated in FIG. 13, this embodiment provides one exemplary circuit schematic of a time-delay lighting circuit.

Comparing to the time-delay lighting circuit shown in FIG. 3, the external power source 110 in the time-delay lighting circuit shown in FIG. 14 is a direct current (DC) power source, the rectifier bridge 232 is therefore omitted. The first end of the C2 capacitor 233 may connect to the second end of the inductor L1 instead of the first DC output end of the rectifier bridge 232. The second end of the capacitor C2 may connect to ground and no longer connect to the second DC output end of the rectifier bridge 232. The filtering components (e.g., the filter circuit 231 including the first inductor L1 and the first capacitor C1, the C2 capacitor 233) may be kept in the time-delay lighting circuit to filter the external power source 110. Other components of the time-delay lighting circuit may be connected and function in a similar manner as described in FIG. 3.

Figure 15:
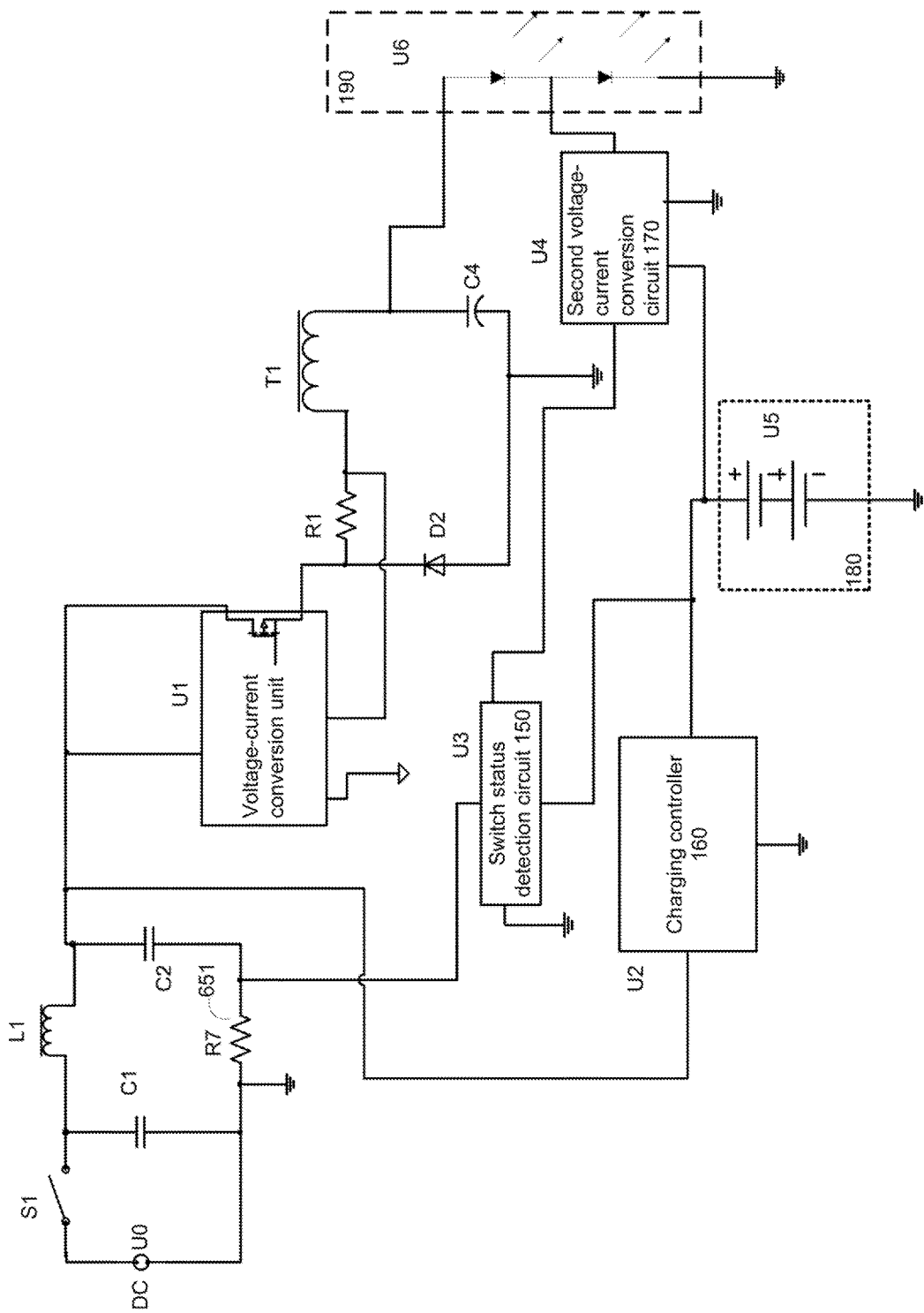
FIG. 15 illustrates another exemplary time-delay lighting circuit consistent with the disclosed embodiment.

FIG. 15 illustrates another exemplary time-delay lighting circuit. Referring to FIG. 7 and FIG. 13, based on the embodiment illustrated in FIG. 13, this embodiment provides one exemplary circuit schematic of a time-delay lighting circuit.

Comparing to the time-delay lighting circuit shown in FIG. 7, the external power source 110 in the time-delay lighting circuit shown in FIG. 15 is a DC power source, the rectifier bridge 232 is therefore omitted. Specifically, the first end of the C2 capacitor 233 may connect to the second end of the inductor L1 instead of the first DC output end of the rectifier bridge 232. The first end of the R7 resistor 651 is connected to the ground and is no longer connected to the rectifier bridge 232. The filtering components (e.g., the filter circuit 231 including the first inductor L1 and the first capacitor C1, the C2 capacitor 233) may be kept in the time-delay lighting circuit to filter the voltage/current inputted from the external power source 110. Other components of the time-delay lighting circuit may be connected and function in a similar manner as described in FIG. 7.

Figure 16:
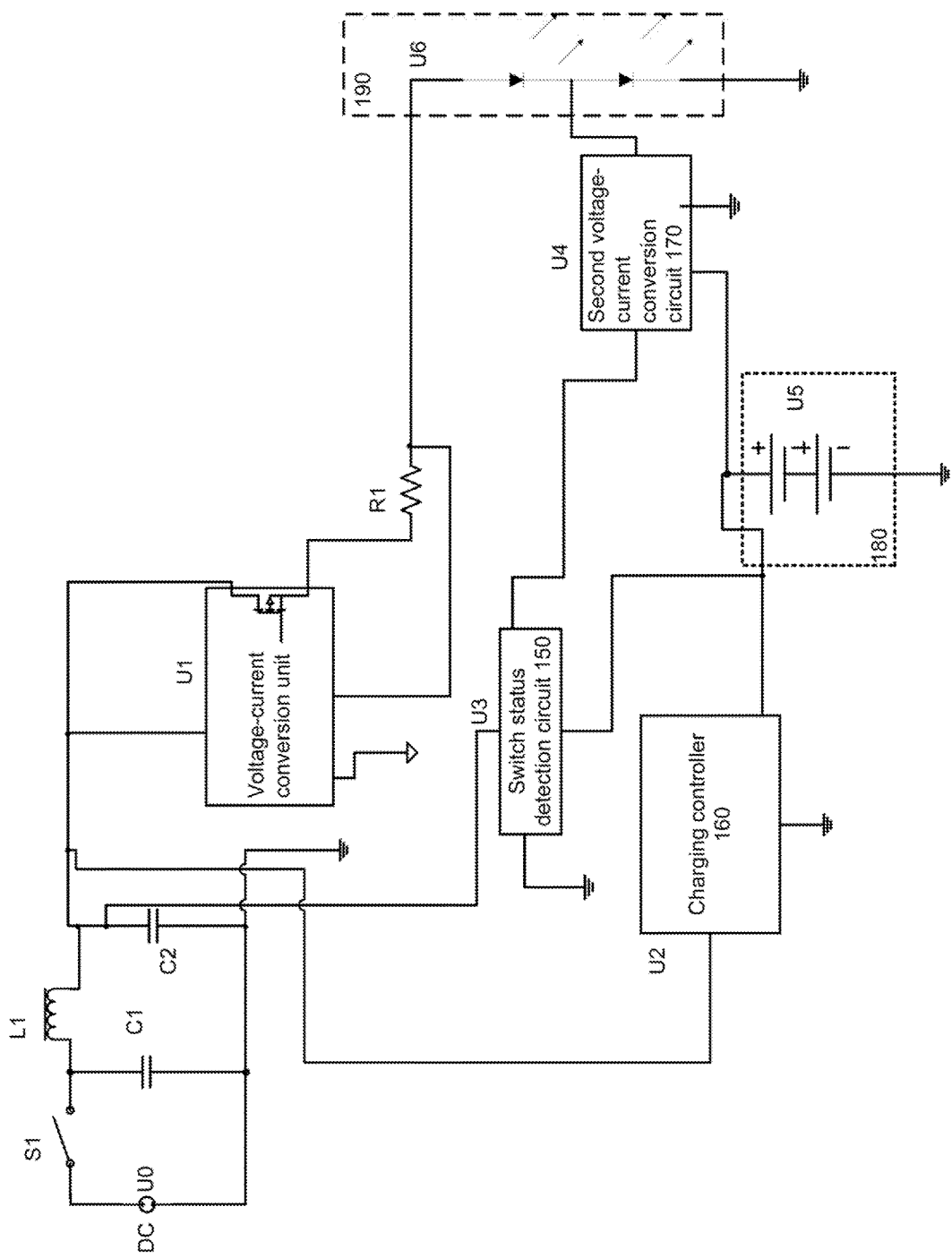
FIG. 16 illustrates another exemplary time-delay lighting circuit consistent with the disclosed embodiment.

FIG. 16 illustrates another exemplary time-delay lighting circuit. Referring to FIG. 5 and FIG. 13, based on the embodiment illustrated in FIG. 13, this embodiment provides one exemplary circuit schematic of a time-delay lighting circuit.

Comparing to the time-delay lighting circuit shown in FIG. 5, the external power source 110 in the time-delay lighting circuit shown in FIG. 16 is a DC power source, the rectifier bridge 232 is therefore omitted. The first end of the capacitor C2 may connect to the second end of the inductor L1 instead of the first DC output end of the rectifier bridge 232. The second end of the capacitor C2 may connect to ground and no longer connect to the second DC output end of the rectifier bridge 232. The filtering components (e.g., the filter circuit 231 including the first inductor L1 and the first capacitor C1, the C2 capacitor 233) may be kept in the time-delay lighting circuit to filter the voltage/current inputted from the external power source 110. Other components of the time-delay lighting circuit may be connected and function in a similar manner as described in FIG. 5.

Figure 17:
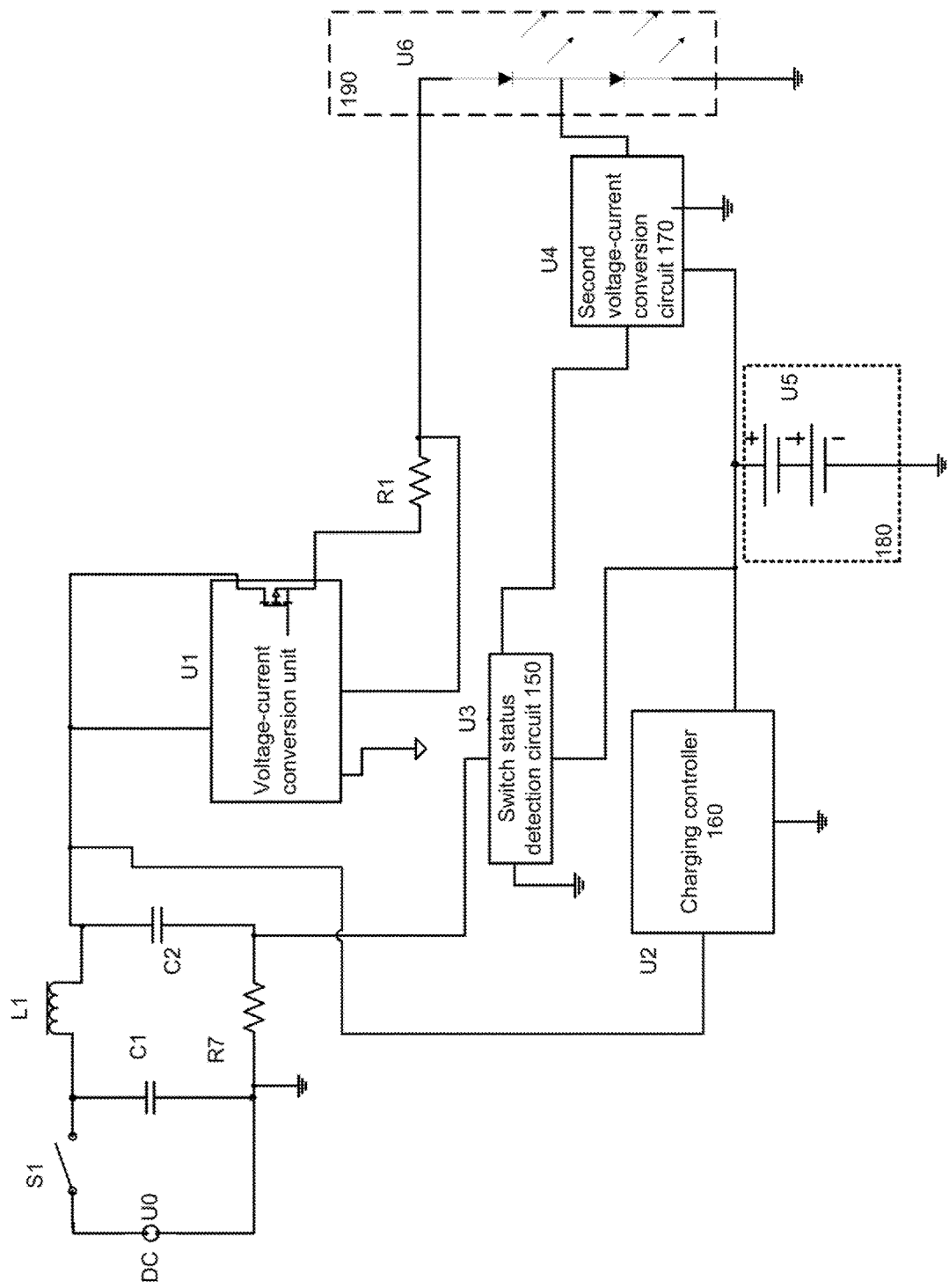
FIG. 17 illustrates another exemplary time-delay lighting circuit consistent with the disclosed embodiment.

FIG. 17 illustrates another exemplary time-delay lighting circuit. Referring to FIG. 9 and FIG. 13, based on the embodiment illustrated in FIG. 13, this embodiment provides one exemplary circuit schematic of a time-delay lighting circuit.

Comparing to the time-delay lighting circuit shown in FIG. 9, the external power source 110 in the time-delay lighting circuit shown in FIG. 17 is a DC power source, the rectifier bridge 232 is therefore omitted. The first end of the C2 capacitor 233 may connect to the second end of the inductor L1 instead of the first DC output end of the rectifier bridge 232. The first end of the R7 resistor 651 is connected to the ground and is no longer connected to the rectifier bridge 232. The filtering components (e.g., the filter circuit 231 including the first inductor L1 and the first capacitor C1, the C2 capacitor 233) may be kept in the time-delay lighting circuit to filter the voltage/current inputted from the external power source 110. Other components of the time-delay lighting circuit may be connected and function in a similar manner as described in FIG. 9.

Figure 18:
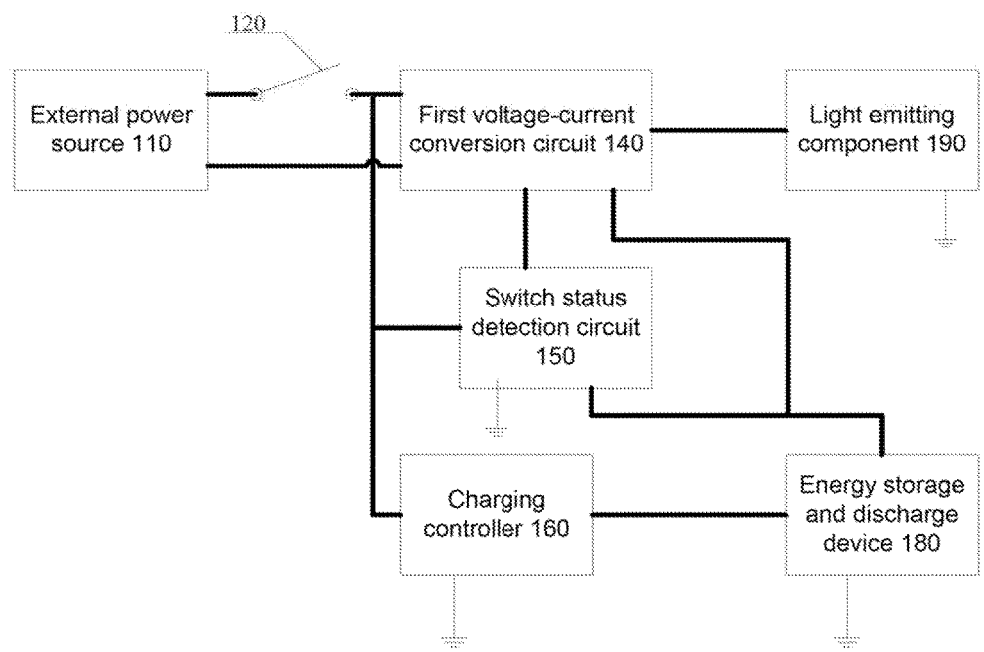
FIG. 18 illustrates another structural diagram of an exemplary time-delay lighting circuit consistent with the disclosed embodiment.

FIG. 18 illustrates another structural diagram of an exemplary time-delay lighting circuit consistent with the disclosed embodiments. As shown in FIG. 18, the time-delay lighting circuit may be configured to control a light emitting component 190, and an input end of the time-delay lighting circuit may connect to an external power source 110 via a control switch 120. The time-delay lighting circuit may include a first voltage-current conversion circuit 140, a switch status detection circuit 150, a charging controller 160, and an energy storage and discharge device 180.

Comparing to the structural diagram shown in FIG. 1A and FIG. 1B, the AC-DC converter 130 and the second voltage-current conversion circuit 140 are omitted in the time-delay lighting circuit shown in FIG. 18.

Specifically, the first voltage-current conversion circuit 140 may be configured to convert a first inputted voltage/current to a voltage/current satisfying working conditions of the light emitting component 190. The energy storage and discharge device 180 may be configured to provide power to the light emitting component 190 when the control switch 120 is switched off to disconnect the external power source 110 from the time-delay lighting circuit. The charging controller 150 may be configured to charge the energy storage and discharge device 180 when the control switch 120 is switched on to connect the external power source 110 to the time-delay lighting circuit. The switch status detection circuit 150 may be configured to detect an on/off status of the control switch 120, and when the control switch 120 is detected to be switched off, control the energy storage and discharge device 180 to provide power to the light emitting component 190.

Further, an input end of the first voltage-current conversion circuit 140 may be connected to the external power source 110 via the control switch 120, and an output end of the first voltage-current conversion circuit 140 may be connected to the light emitting component 190. The switch status detection circuit 150 may be connected to the first voltage-current conversion circuit 140 and the energy storage and discharge device 180, respectively. The charging controller 160 may be connected to the external power source 110 and the energy storage and discharge device 180, respectively. In some embodiments, the first voltage-current conversion circuit 140 is further connected to the energy storage and discharge device 180.

In some embodiments, when the switch status detection circuit 150 detects that the control switch 120 is switched off, the switch status detection circuit 150 may output a switch-on signal to the first voltage-current conversion circuit 140 to enable the energy storage and discharge device 180 to discharge and provide power supply to the light emitting component 190 via the first voltage-current conversion circuit 140. The switch status detection circuit 150 may further detect a voltage outputted by the energy storage and discharge device 180, and when the voltage outputted by the energy storage and discharge device 180 is detected to be lower than a preset value, output a switch-off signal to the first voltage-current conversion circuit 140. When receiving the switch-off signal, the first voltage-current conversion circuit 140 switches off the power supply from the energy storage and discharge device 180 to the light emitting component 190.

Accordingly, when the control switch 120 is switched on, the first voltage-current conversion circuit 140 may convert the inputted voltage/current from the external power source to the voltage satisfying working conditions of the light emitting component 190; and when the switch status detection circuit detects that the control switch is switched off, according to the switch-on signal from the switch status detection circuit 150, the first voltage-current conversion circuit 140 may convert the inputted voltage/current from the energy storage and discharge device 180 to the voltage satisfying working conditions of the light emitting component 190.

In some embodiments, the switch status detection circuit 150 may be configured to output a switch-off signal to stop the energy storage and discharge device 180 from discharging when a preset time period has passed from when the switch status detection circuit 150 detects the control switch 120 is switched-off. For example, the switch status detection circuit 150 may detect that the control switch 120 is switched-off and accordingly control the energy storage and discharge device 180 to discharge and provide power to the light emitting component 190. Further, after the preset time period (e.g., 10 seconds from when the energy storage and discharge device 180 starts discharging), the switch status detection circuit 150 may control the energy storage and discharge device 180 to stop discharging, and the light emitting component 190 may stop emitting light.

It can be understood that, in some embodiments, when an AC-DC converter is added into the time-delay lighting circuit shown in FIG. 18, the time-delay lighting circuit as shown in FIG. 11 may be obtained. Specifically, an input end of the AC-DC converter may be connected to the external power source 110 via the control switch 120; and an output end of the AC-DC converter may be connected to the first voltage-current conversion circuit 140 and the charging controller 160, respectively.

Further, in some embodiments, when a second voltage-current conversion circuit is added into the time-delay lighting circuit shown in FIG. 18, the time-delay lighting circuit as shown in FIG. 13 may be obtained. The second voltage-current conversion circuit may be connected to the energy storage and discharge device 180, and the switch status detection circuit 150, respectively. The second voltage-current conversion circuit may be configured to convert an inputted voltage/current from the energy storage and discharge device 180 to the voltage/current satisfying working conditions of the light emitting component 190. When the switch status detection circuit 150 detects the control switch 120 is switched-off and outputs a switch-on signal to the second voltage-current conversion circuit for enabling the energy storage and discharge device 180 to provide power to the light emitting component 190. In some embodiments, the light emitting component 190 may include multiple light emitting entities (e.g., LEDs). The switch status detection circuit 150 is further configured to send a switch-on signal to the second voltage-current conversion circuit for controlling the energy storage and discharge device 180 to provide power supply to at least one of the multiple light emitting entities. Further, the second voltage-current conversion circuit may be configured to, when receiving the switch-on signal from the switch status detection circuit 150, convert the voltage/current from the energy storage and discharge device 180 to working voltage/current of at least one of the multiple light emitting entities.

Moreover, in some embodiments, when the second voltage-current conversion circuit and the AC-DC converter are both added into the time-delay lighting circuit shown in FIG. 18, the time-delay lighting circuit as shown in FIG. 1A or FIG. 1B may be obtained.

Figure 19:
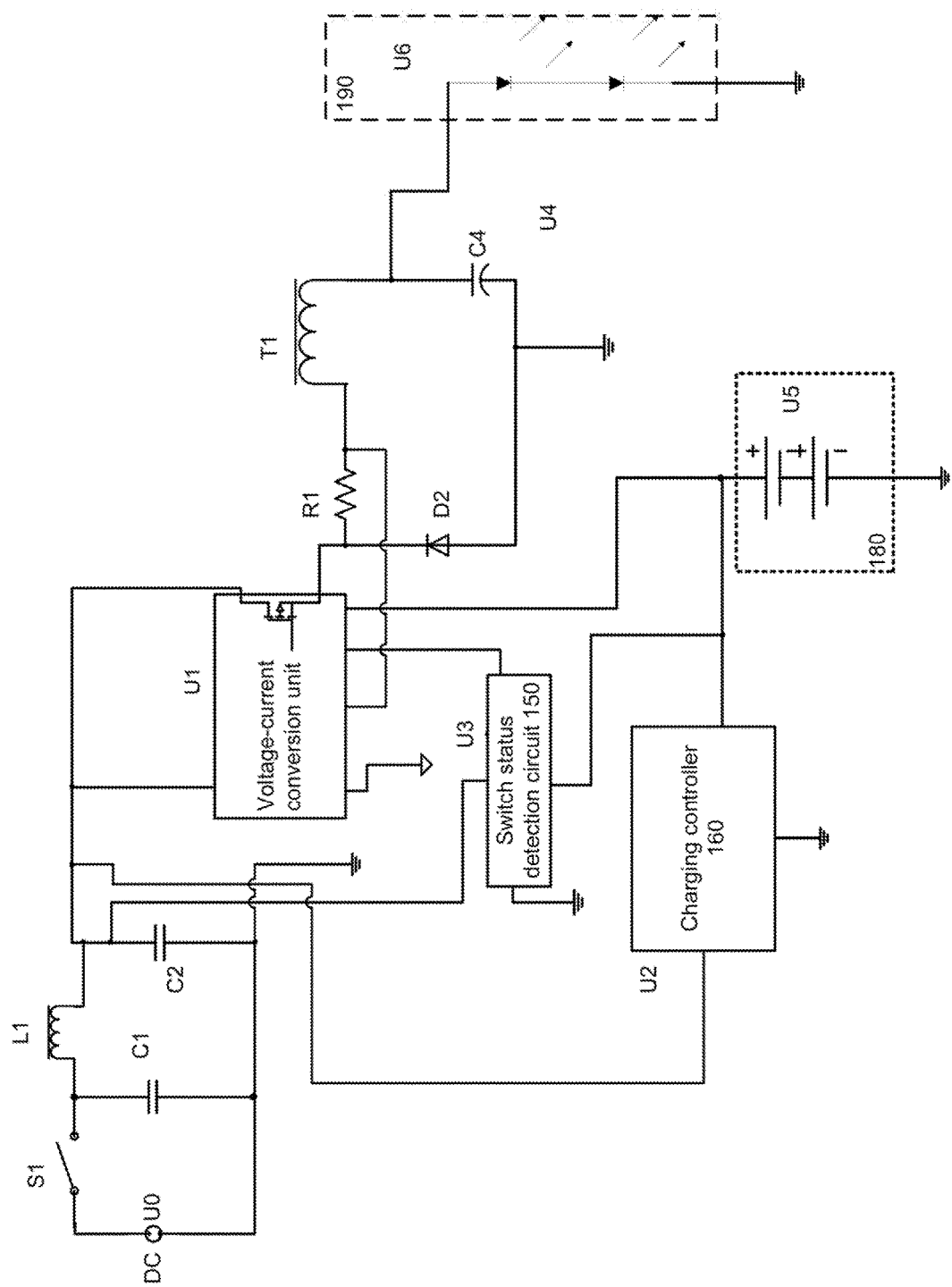
FIG. 19 illustrates another exemplary time-delay lighting circuit consistent with the disclosed embodiment.

FIG. 19 illustrates another exemplary time-delay lighting circuit. Referring to FIG. 12 and FIG. 18, based on the embodiment illustrated in FIG. 18, this embodiment provides one exemplary circuit schematic of a time-delay lighting circuit.

Comparing to the time-delay lighting circuit shown in FIG. 12, the external power source 110 in the time-delay lighting circuit shown in FIG. 19 is a DC power source, the rectifier bridge 232 is therefore omitted. The first end of the capacitor C2 may connect to the second end of the inductor L1 instead of the first DC output end of the rectifier bridge 232. The second end of the capacitor C2 may connect to ground and no longer connect to the second DC output end of the rectifier bridge 232. The filtering components (e.g., the filter circuit 231 including the first inductor L1 and the first capacitor C1, the C2 capacitor 233) may be kept in the time-delay lighting circuit to filter the voltage/current inputted from the external power source 110. Other components of the time-delay lighting circuit may be connected and function in a similar manner as described in FIG. 12.

Figure 20:
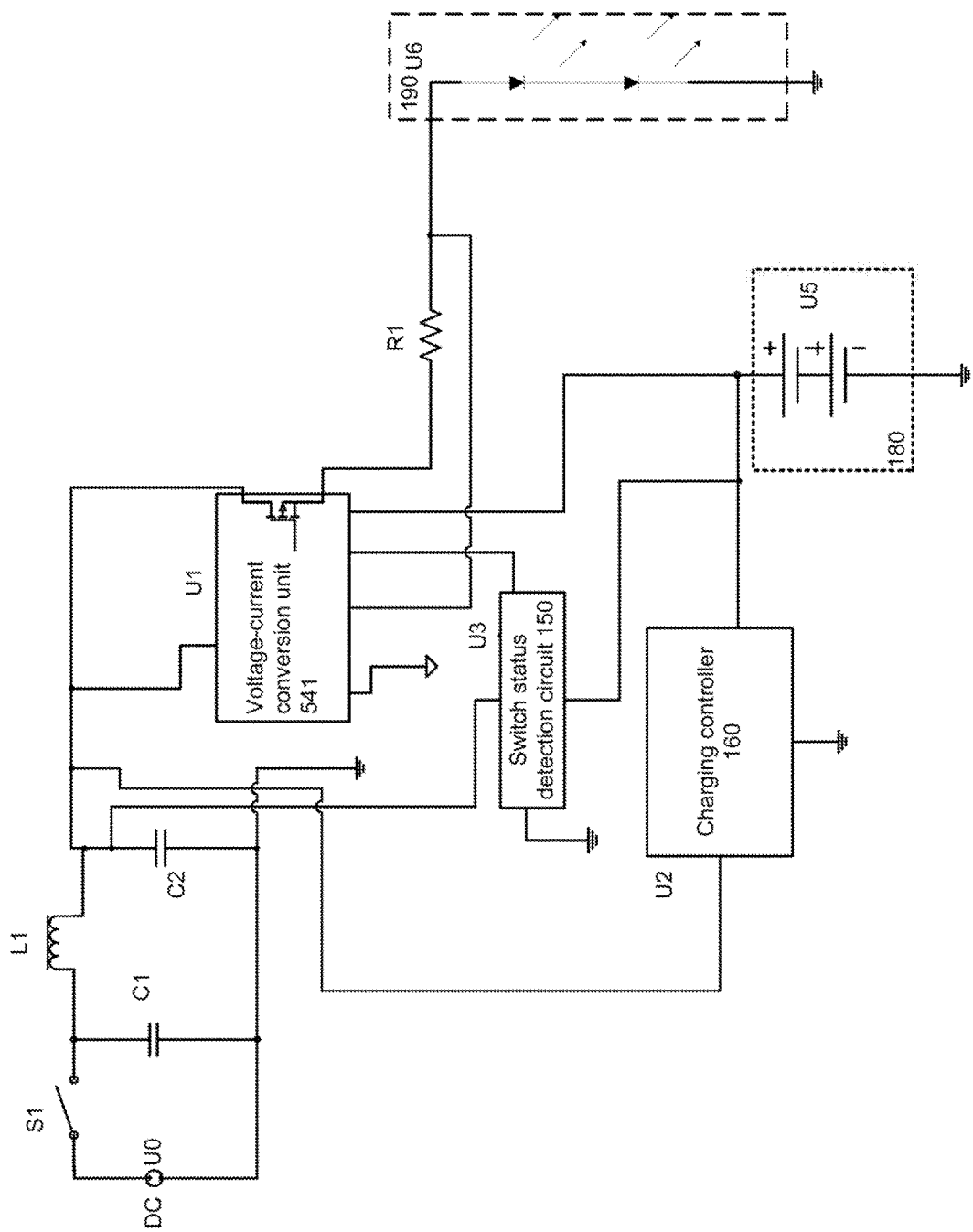
FIG. 20 illustrates another exemplary time-delay lighting circuit consistent with the disclosed embodiment.

FIG. 20 illustrates another exemplary time-delay lighting circuit. Referring to FIG. 12 and FIG. 18, based on the embodiment illustrated in FIG. 18, this embodiment provides one exemplary circuit schematic of a time-delay lighting circuit. As shown in FIG. 20, the fourth implementation of the first voltage-current conversion circuit 140 (e.g., as described in FIG. 5) may be applied in the time-delay lighting circuit.

Comparing to the time-delay lighting circuit shown in FIG. 5, the AC-DC converter and the second voltage-current conversion circuit are omitted. The first end of the capacitor C2 may connect to the second end of the inductor L1 instead of the first DC output end of the rectifier bridge 232. The second end of the capacitor C2 may connect to ground and no longer connect to the second DC output end of the rectifier bridge 232. The switch status detection circuit 150 may connect to the voltage-current conversion unit 541. The energy storage and discharge device 180 may connect to the voltage-current conversion unit 541. The switch status detection circuit 150 may be configured to detect the status of the control switch (e.g., by determining a voltage on the capacitor C2); and when an off status is detected, enable the connection between the energy storage and discharge device 180 and the first voltage-current conversion circuit 140, such that the energy storage and discharge device 180 may discharge and provide power to the light emitting component 190 via the first voltage-current conversion circuit 140.

Figure 21:
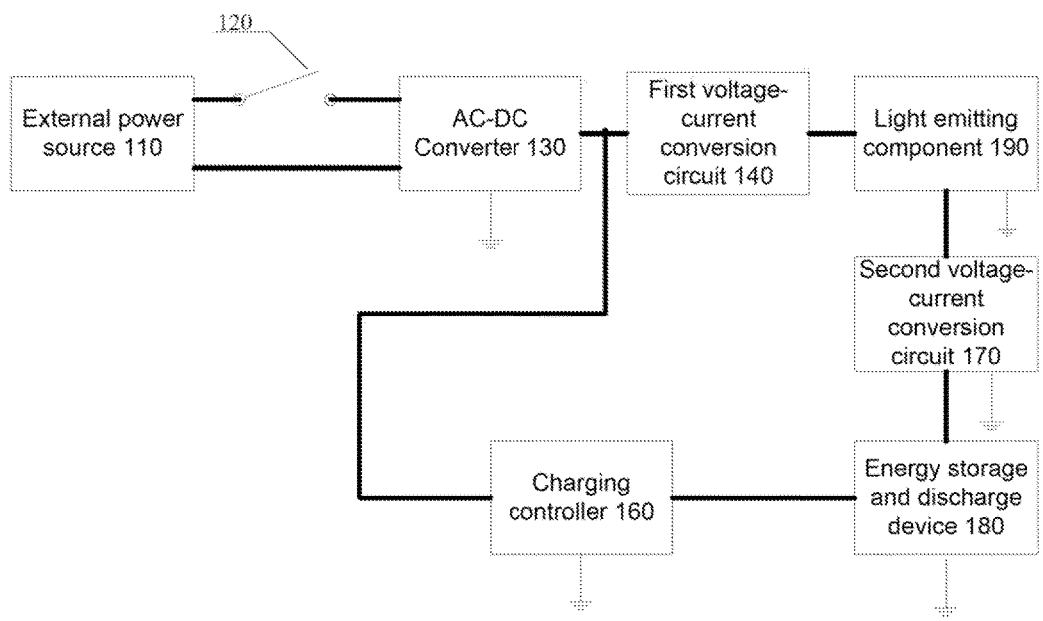
FIG. 21 illustrates another structural diagram of an exemplary time-delay lighting circuit consistent with the disclosed embodiment.

FIG. 21 illustrates another structural diagram of an exemplary time-delay lighting circuit consistent with the disclosed embodiments. As shown in FIG. 21, the time-delay lighting circuit may be configured to control a light emitting component 190, and an input end of the time-delay lighting circuit may connect to an external power source 110 via a control switch 120. The time-delay lighting circuit may include an AC-DC converter 130, a first voltage-current conversion circuit 140, a charging controller 160, a second voltage-current conversion circuit 170, and an energy storage and discharge device 180.

Comparing to the structural diagram shown in FIG. 1A and FIG. 1B, the switch status detection circuit 150 is omitted in the time-delay lighting circuit shown in FIG. 21.

Specifically, an input end of the AC-DC converter 130 may connect to the external power source 110 via the control switch 120. An output end of the AC-DC converter 130 may connect to an input end of the first voltage-current conversion circuit 140. Further, an output end of the first voltage-current conversion circuit 140 may be connected to the light emitting component 190. The first voltage-current conversion circuit 140 may be configured to convert an input voltage/current (e.g., from the external power source 110) to a normal operating voltage/current of the light emitting component 190 when the control switch 120 is switched on.

The charging controller 160 may be connected to the output end of the AC-DC converter 130 and an input end of the energy storage and discharge device 180, respectively. The energy storage and discharge device 180 may connect to the charging controller 160 and the second voltage-current conversion circuit 170, respectively. The energy storage and discharge device 180 may be configured to provide power to the light emitting component 190 via the second voltage-current conversion circuit 170 when the control switch 120 is switched off to disconnect the external power source 110 from the time-delay lighting circuit. The charging controller 150 may be configured to charge the energy storage and discharge device 180 when the control switch 120 is switched on and the AC-DC converter 130 outputs a DC voltage. The second voltage-current conversion circuit 170 may be configured to convert voltage and/or current inputted from the energy storage and discharge device 180 to a voltage and/or current satisfying preset conditions for the light emitting component 190.

In the time-delay lighting circuit shown in FIG. 21, when the control switch 120 is switched on, the first voltage-current conversion circuit 140 is operating and providing voltage/current satisfying working conditions of the light emitting component 190. Further, when the energy storage and discharge device 180 is charged to a level that can trigger the second voltage-current conversion circuit 170 to switch on, the second voltage-current conversion circuit 170 may also be operating when the control switch 120 is switched on. The first voltage-current conversion circuit 140 is the main unit providing voltage/current satisfying working conditions of the light emitting component 190 converted from the external power source 110.

When the control switch 120 is switched off, the first voltage-current conversion circuit 140 stops operating, and the energy storage and discharge device 180 is the single power source for the light emitting component 190. Specifically, the second voltage-current conversion circuit 170 is switched on when the voltage inputted from the energy storage and discharge device 180 is above a preset threshold. The second voltage-current conversion circuit 170 converts the voltage and/or current inputted from the energy storage and discharge device 180 to a voltage and/or current satisfying preset conditions for the light emitting component 190. The light emitting component 190 may emit light after the control switch 120 is switched off. When the voltage inputted from the energy storage and discharge device 180 is below the preset threshold (e.g., after discharging for a certain time period), the second voltage-current conversion circuit 170 may be switched off, and the light emitting component 190 stops emitting light. Therefore, the time-delay lighting function can be accomplished without detecting the on/off status of the control switch.

Figure 22:
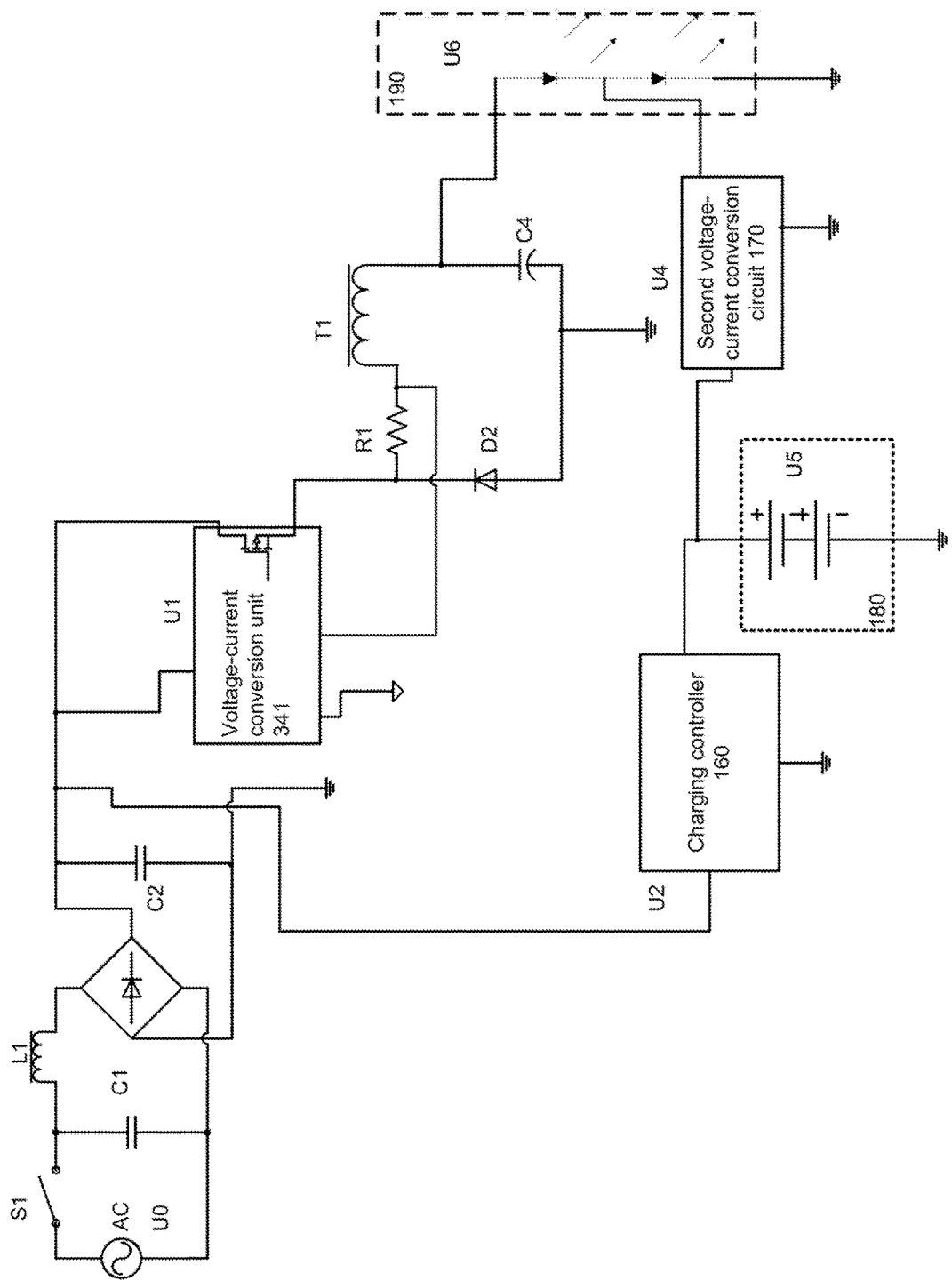
FIG. 22 illustrates another exemplary time-delay lighting circuit consistent with the disclosed embodiment.

FIG. 22 illustrates another exemplary time-delay lighting circuit. Referring to FIG. 3, and FIG. 21, based on the embodiment illustrated in FIG. 21, this embodiment provides another exemplary circuit schematic of a time-delay lighting circuit.

Comparing to the time-delay lighting circuit shown in FIG. 3, the switch status detection circuit 150 is omitted in the time-delay lighting circuit shown in FIG. 22. Other components of the time-delay lighting circuit may be connected in a similar manner as described in FIG. 3. Without detecting the on/off status of the control switch 120, the time-delay lighting circuit shown in FIG. 22 can implement similar time-delay lighting functions as the time-delay lighting circuit shown in FIG. 3.

Figure 23:
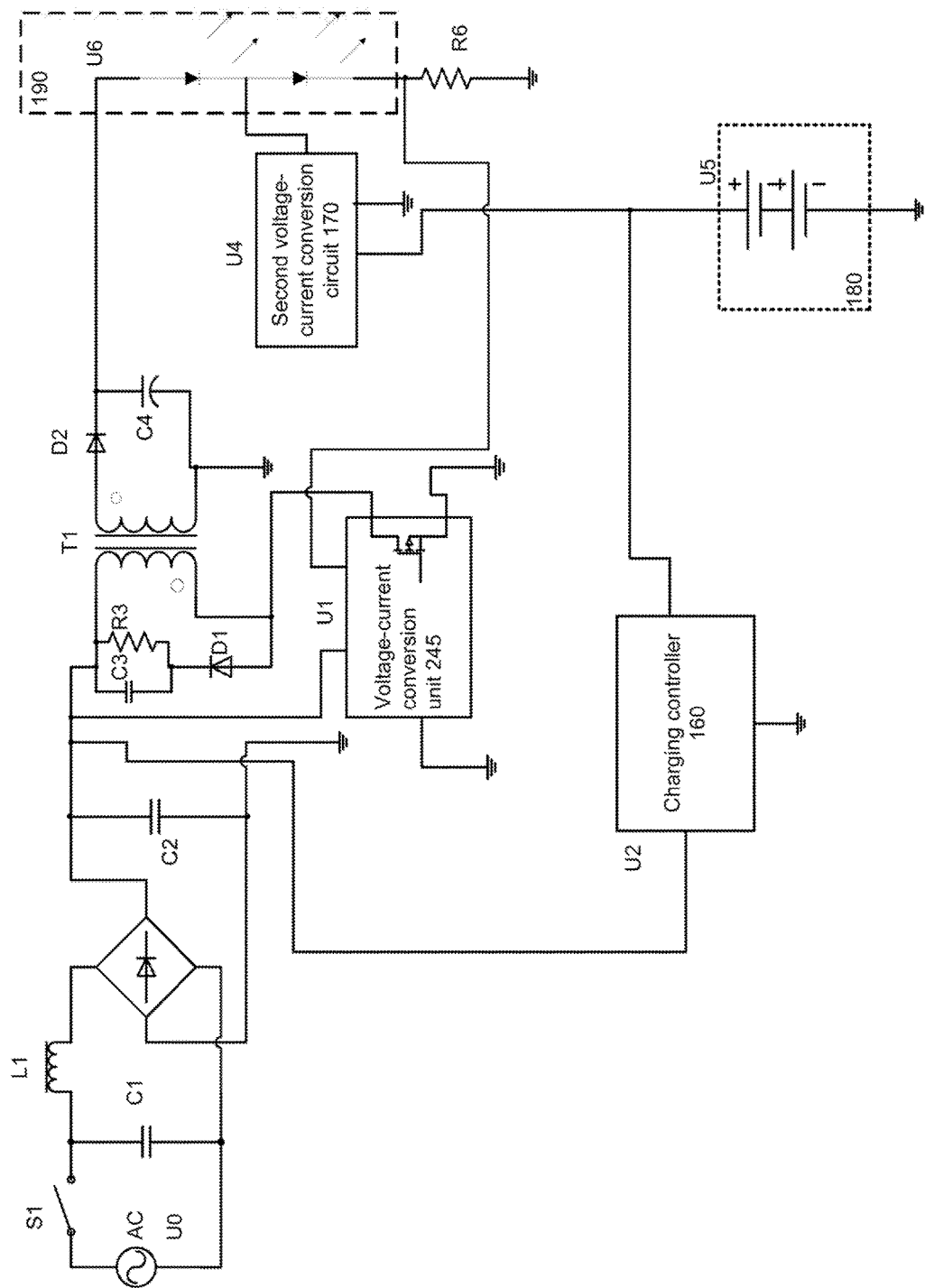
FIG. 23 illustrates another exemplary time-delay lighting circuit consistent with the disclosed embodiment.

FIG. 23 illustrates another exemplary time-delay lighting circuit. Referring to FIG. 2, and FIG. 21, based on the embodiment illustrated in FIG. 21, this embodiment provides another exemplary circuit schematic of a time-delay lighting circuit.

Comparing to the time-delay lighting circuit shown in FIG. 2, the switch status detection circuit 150 is omitted in the time-delay lighting circuit shown in FIG. 23. Other components of the time-delay lighting circuit may be connected in a similar manner as described in FIG. 2. Without detecting the on/off status of the control switch 120, the time-delay lighting circuit shown in FIG. 23 can implement similar time-delay lighting functions as the time-delay lighting circuit shown in FIG. 2.

Figure 24:
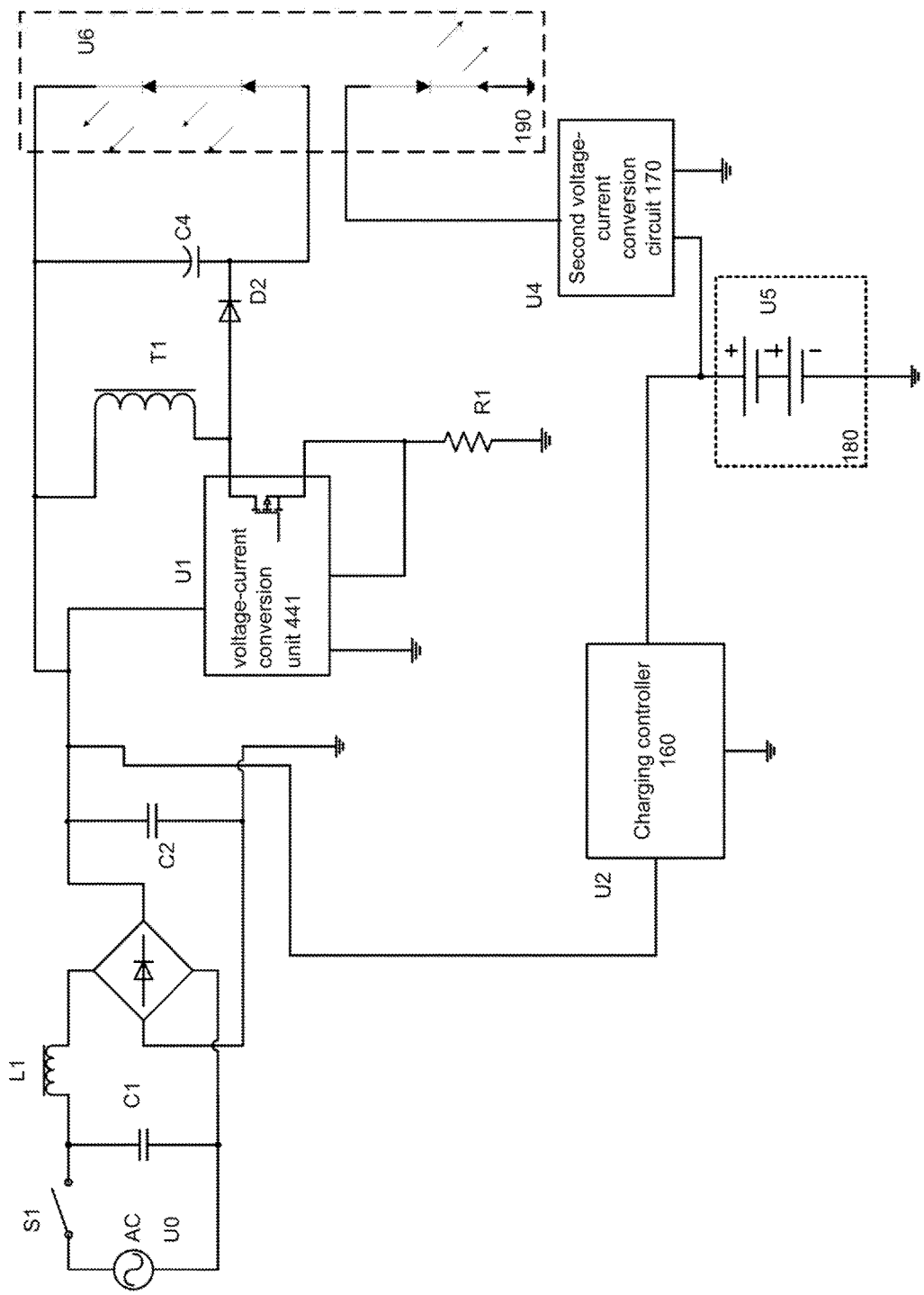
FIG. 24 illustrates another exemplary time-delay lighting circuit consistent with the disclosed embodiment.

FIG. 24 illustrates another exemplary time-delay lighting circuit. Referring to FIG. 4, and FIG. 21, based on the embodiment illustrated in FIG. 21, this embodiment provides another exemplary circuit schematic of a time-delay lighting circuit.

Comparing to the time-delay lighting circuit shown in FIG. 4, the switch status detection circuit 150 is omitted in the time-delay lighting circuit shown in FIG. 24. Other components of the time-delay lighting circuit may be connected in a similar manner as described in FIG. 4. Without detecting the on/off status of the control switch 120, the time-delay lighting circuit shown in FIG. 24 can implement similar time-delay lighting functions as the time-delay lighting circuit shown in FIG. 4.

Figure 25:
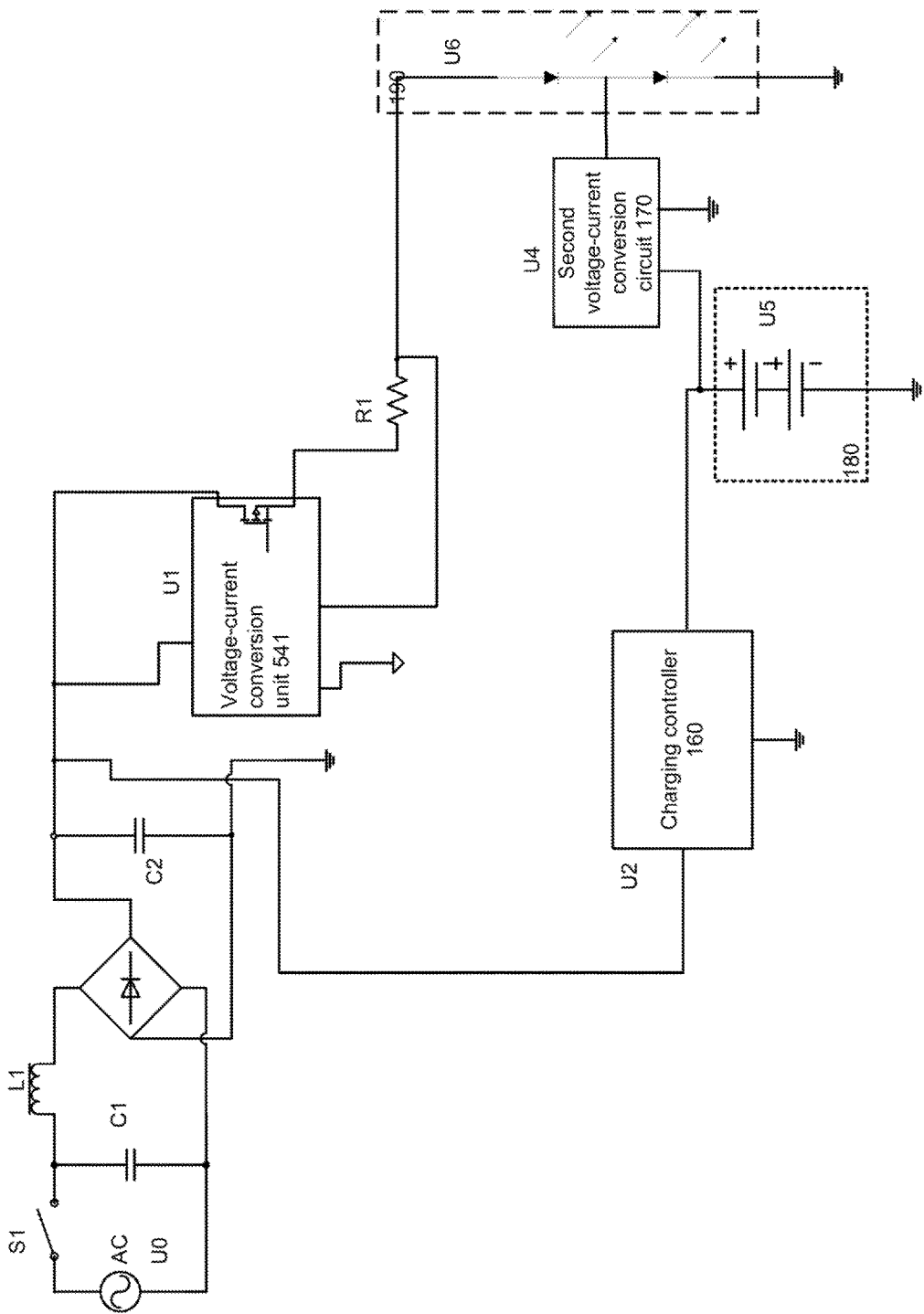
FIG. 25 illustrates another exemplary time-delay lighting circuit consistent with the disclosed embodiment.

FIG. 25 illustrates another exemplary time-delay lighting circuit. Referring to FIG. 5, and FIG. 21, based on the embodiment illustrated in FIG. 21, this embodiment provides another exemplary circuit schematic of a time-delay lighting circuit.

Comparing to the time-delay lighting circuit shown in FIG. 5, the switch status detection circuit 150 is omitted in the time-delay lighting circuit shown in FIG. 25. Other components of the time-delay lighting circuit may be connected in a similar manner as described in FIG. 5. Without detecting the on/off status of the control switch 120, the time-delay lighting circuit shown in FIG. 25 can implement similar time-delay lighting functions as the time-delay lighting circuit shown in FIG. 5.

Figure 26:
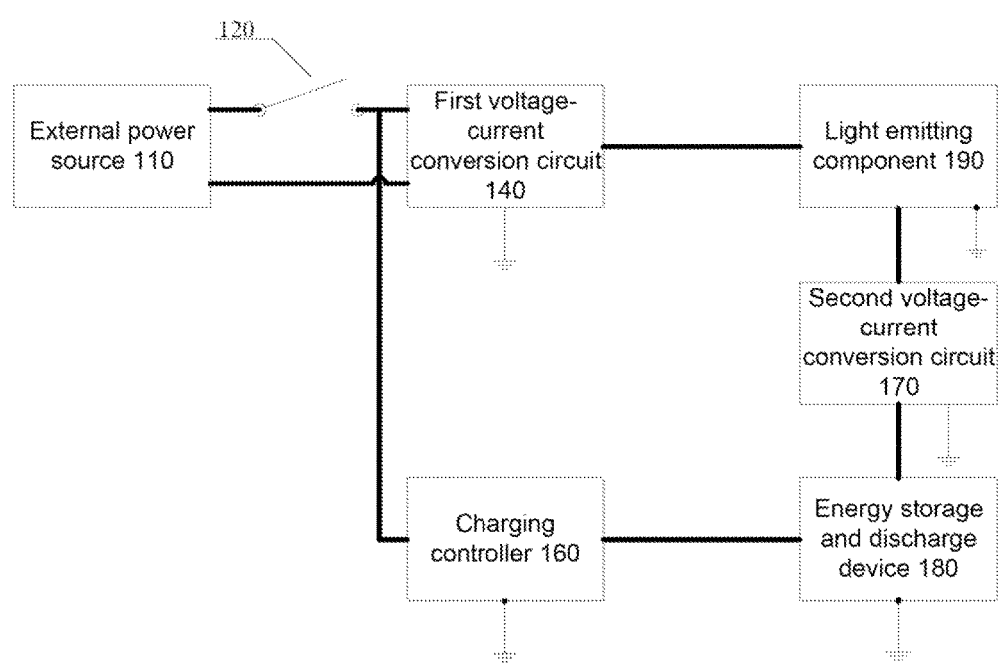
FIG. 26 illustrates another structural diagram of an exemplary time-delay lighting circuit consistent with the disclosed embodiment.

FIG. 26 illustrates another structural diagram of an exemplary time-delay lighting circuit consistent with the disclosed embodiments. As shown in FIG. 26, the time-delay lighting circuit may be configured to control a light emitting component 190, and an input end of the time-delay lighting circuit may connect to an external power source 110 via a control switch 120. The time-delay lighting circuit may include a first voltage-current conversion circuit 140, a charging controller 160, a second voltage-current conversion circuit 170, and an energy storage and discharge device 180.

Comparing to the structural diagram shown in FIG. 21, the AC-DC converter is omitted in the time-delay lighting circuit shown in FIG. 26. A first input end of the first voltage-current conversion circuit 140 may connect to the external power source 110 via the control switch 120. An output end of the first voltage-current conversion circuit 140 may connect to the input end of the light emitting component 190, such that the first voltage-current conversion circuit 140 may convert an input voltage/current (e.g., from the power source 110) to a normal operating voltage/current of the light emitting component 190.

The energy storage and discharge device 180 may connect to the charging controller 160 and the second voltage-current conversion circuit 170, respectively. The second voltage-current conversion circuit 170 may be connected to the light emitting component 190 and configured to convert the voltage/current from the energy storage and discharge device 180 to a normal operating voltage/current of the light emitting component 190. The charging controller may be configured to charge the energy storage and discharge device 180 when the control switch 120 is switched on.

In the time-delay lighting circuit shown in FIG. 26, when the control switch 120 is switched on, the first voltage-current conversion circuit 140 is operating and providing voltage/current satisfying working conditions of the light emitting component 190. Further, when the energy storage and discharge device 180 is charged to a level that can trigger the second voltage-current conversion circuit 170 to switch on, the second voltage-current conversion circuit 170 may also be operating when the control switch 120 is switched on.

When the control switch 120 is switched off, the first voltage-current conversion circuit 140 stops operating, and the energy storage and discharge device 180 is the single power source for the light emitting component 190. Specifically, the second voltage-current conversion circuit 170 is switched on when a voltage inputted from the energy storage and discharge device 180 is above a preset threshold. The second voltage-current conversion circuit 170 converts the voltage and/or current inputted from the energy storage and discharge device 180 to a voltage and/or current satisfying preset conditions for the light emitting component 190. The light emitting component 190 may emit light after the control switch 120 is switched off. When the voltage inputted from the energy storage and discharge device 180 is below the preset threshold (e.g., after discharging for a certain time period), the second voltage-current conversion circuit 170 may be switched off, and the light emitting component 190 stops emitting light. Therefore, the time-delay lighting function can be accomplished without detecting the on/off status of the control switch.

Figure 27:
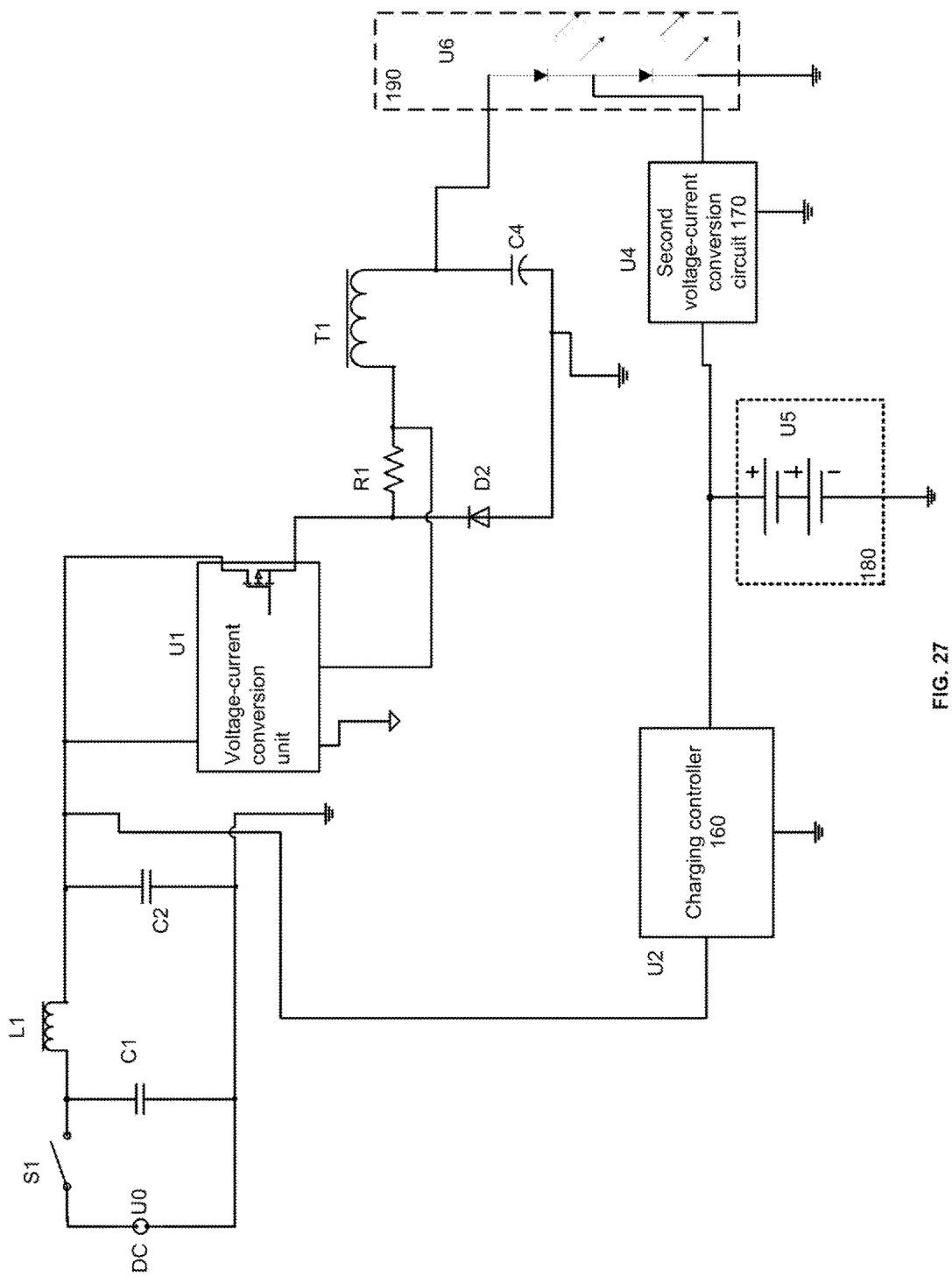
FIG. 27 illustrates another exemplary time-delay lighting circuit consistent with the disclosed embodiment.

FIG. 27 illustrates another exemplary time-delay lighting circuit. Referring to FIG. 14, and FIG. 26, based on the embodiment illustrated in FIG. 26, this embodiment provides another exemplary circuit schematic of a time-delay lighting circuit.

Comparing to the time-delay lighting circuit shown in FIG. 14, the switch status detection circuit 150 is omitted in the time-delay lighting circuit shown in FIG. 26. Other components of the time-delay lighting circuit may be connected in a similar manner as described in FIG. 14. Without detecting the on/off status of the control switch 120, the time-delay lighting circuit shown in FIG. 26 can implement similar time-delay lighting functions as the time-delay lighting circuit shown in FIG. 14.

Figure 28:
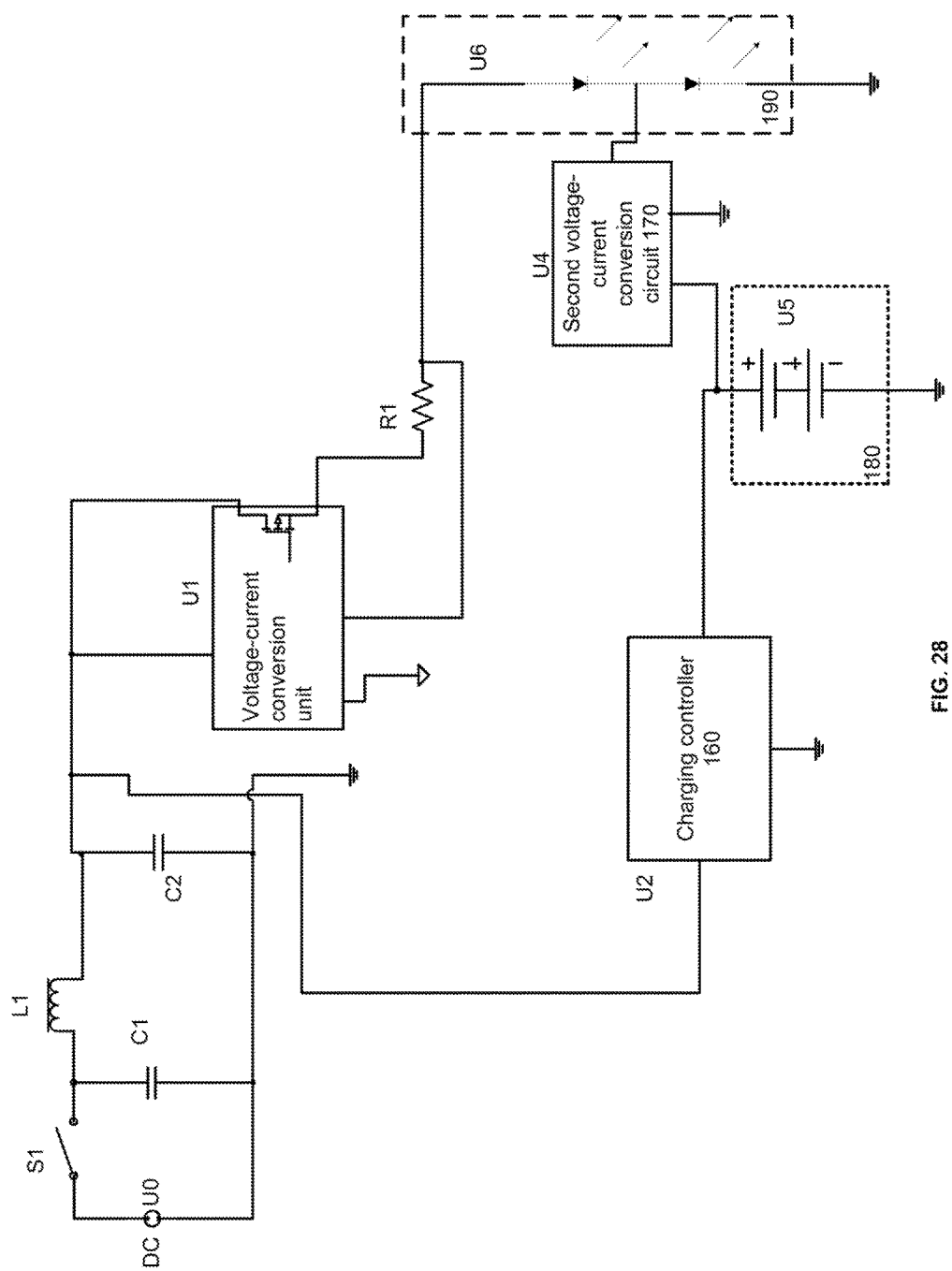
FIG. 28 illustrates another exemplary time-delay lighting circuit consistent with the disclosed embodiment.

FIG. 28 illustrates another exemplary time-delay lighting circuit. Referring to FIG. 16, and FIG. 26, based on the embodiment illustrated in FIG. 26, this embodiment provides another exemplary circuit schematic of a time-delay lighting circuit.

Comparing to the time-delay lighting circuit shown in FIG. 16, the switch status detection circuit 150 is omitted in the time-delay lighting circuit shown in FIG. 28. Other components of the time-delay lighting circuit may be connected in a similar manner as described in FIG. 16. Without detecting the on/off status of the control switch 120, the time-delay lighting circuit shown in FIG. 28 can implement similar time-delay lighting functions as the time-delay lighting circuit shown in FIG. 16.

Figure 29:
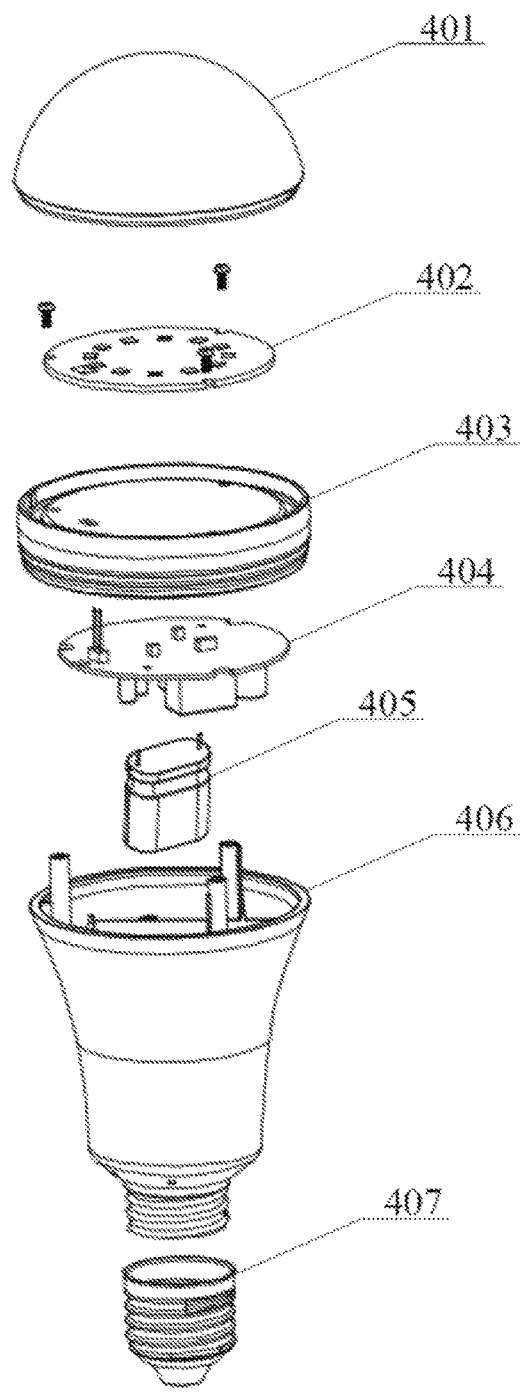
FIG. 29 illustrates an exemplary time-delay lighting device consistent with the disclosed embodiment.

FIG. 29 illustrates an exemplary time-delay lighting device. The time-delay lighting device provided by the present disclosure may be used in any place that requires time-delay lighting at home, such as a living room, a bedroom, a rest room, and aisles. As shown in FIG. 29, the time-delay lighting device may include a light emitting component 402 and a time-delay lighting circuit board 404. Specifically, a time-delay lighting circuit as shown in any figure of FIG. 1A to FIG. 28 may be disposed on the time-delay lighting circuit board 404, and the light emitting component 402 may be electrically connected to the time-delay lighting circuit board 404. The light emitting component 402 may be the light emitting component 190 as shown in FIG. 1A to FIG. 28.

The time-delay lighting device may further include: a lamp cup 406, a lamp holder 407, a heat sink 403, and a lamp cover 401. Specifically, the time-delay lighting circuit board 404 may be disposed inside the lamp cup 406, and a closed-end of the lamp cup 406 may connect to the lamp holder 407. The light emitting component 402 may be disposed in an open-end of the lamp cup 406, the lamp cover 401 may be configured to cover the light emitting component 402, and the heat sink 403 may be disposed between the light emitting component 402 and the time-delay lighting circuit board 404. The light emitting component 402 may include one or more light emitting diodes.

In one embodiment, the lamp holder 407 and the lamp cup 406 may be aligned and tightened via corresponding screw threads, respectively. The energy storage and discharge device 405 (e.g., energy storage and discharge device 180) may be electrically connected to the time-delay lighting circuit board 404 via welding or some other method, or may be integrated on the time-delay lighting circuit board 404. The heat sink 403 may be disposed between the light emitting component 402 and the time-delay lighting circuit board 404. Specifically, a screw may be used to fix the heat sink 403 in the light emitting component 402 to cool the light emitting component 402. In some embodiments, the heat sink 403 may generally have a cylinder shape, and a diameter of the cross section of the heat sink 403 may be greater than that of a plate holding the light emitting component 402.

The light emitting component 402 may be electrically connected to the time-delay lighting circuit board 404 via wires. The lamp cover 401 and the lamp cup 406 may be connected via a screw joint or a buckle. The light emitting component 402 may be one or more light emitting diodes with a long service life that produces low heat and saves energy.

The time-delay lighting device provided by the present disclosure may make it possible for the energy storage and discharge device to complete charging in several seconds when the control switch is switched on, and provide time-delay power supply to the light emitting component in a certain period of time after the control switch is switched off. The energy storage and discharge device may connect to the time-delay circuit on the time-delay circuit board, the heat sink may connect to the light emitting component, and the light emitting component may electrically connect to the time-delay circuit on the time-delay circuit board and together disposed in the lamp cup, the lamp cover may emit lights to the lamp cup, the lamp cup may connect to the lamp holder, thus forming a time-delay lighting device displaying a time-delay lighting function. Because the energy storage and discharge device has a long service life and can be quickly charged, the time-delay lighting device may have a long service life, be energy-saving, and provide a stable time-delay function. Further, the time-delay lighting device may put into use with a simple cooperation of a typical control switch and external power source.

Those skilled in the art may understand that the time-delay lighting device provided by the present embodiment is for illustrative purpose only. In specific embodiments, the time-delay lighting circuit may be applied in other lighting devices, thus forming time-delay lighting device. This embodiment may not specifically limit the embodiments of the time-delay lighting device.

Lastly, those embodiments above are merely used to illustrate technical solutions of the present disclosure, but not to limit the scope of the disclosure. Though, referring to previous embodiments, this embodiment is illustrated in details, those skilled in the art may still understand that technical solutions in the previous embodiments may be modified, or partial or the whole technical characteristics may be equally exchanged. The modification or exchange may not deviate the nature of the corresponding technical solutions from technical solutions of each embodiment.

INDUSTRIAL APPLICABILITY AND ADVANTAGEOUS EFFECTS

Without limiting the scope of any claim and/or the specification, examples of industrial applicability and certain advantageous effects of the disclosed embodiments are listed for illustrative purposes. Various alternations, modifications, or equivalents to the technical solutions of the disclosed embodiments can be obvious to those skilled in the art and can be included in this disclosure.

Compared to existing technologies, the time-delay lighting device disclosed in the present disclosure may provide delayed lighting functionalities with conventional control switch. The time-delay lighting device may be installed as a regular lamp. The time-delay lighting device may include a light emitting component and a time-delay lighting circuit. The time-delay lighting circuit may include a switch status detection circuit and an energy storage and discharge device. When the control switch is turned off, the switch status detection circuit may detect the status change and control the energy storage and discharge device to provide power to the light emitting component for a certain time period.

In some embodiments, the brightness level and/or the color of the light emitting component when the control switch is switched on may be different to the brightness level and/or the color of the light emitting component when the control switch is switched off. This feature may be accomplished by configuring the first voltage-current conversion circuit and the second voltage-current conversion circuit differently (e.g., output different PWM or PFM signals and/or different voltage/current), or connecting the first voltage-current conversion circuit and the second voltage-current conversion circuit to the light emitting component differently (e.g., connecting the first voltage-current conversion circuit to two LEDs, and connecting the second voltage-current conversion circuit to one LED).

In some embodiments, the time-delay lighting device may allow the user to select a desired delayed lighting time duration. For example, an energy storage and discharge devices with higher capacity may provide longer delayed lighting duration. The use may set up the time-delay lighting device by configuring the energy storage and discharge device to a capacity corresponding to the desired delayed lighting duration (e.g., by toggling a switch specifically configured to implement this functionality, or by changing the energy storage and discharge device in the time-delay lighting device), or by changing the settings of the switch status detection circuit.

What is claimed is:

1. A time-delay lighting circuit for controlling a light emitting component, an input end of the time-delay lighting circuit being connected to an external power source via a control switch, comprising:
   a first voltage-current conversion circuit configured to convert a first inputted current to a current satisfying working conditions of the light emitting component;
   an energy storage and discharge device configured to provide power to the light emitting component when the control switch is switched off to disconnect the external power source from the time-delay lighting circuit;
   a charging controller configured to charge the energy storage and discharge device when the control switch is switched on to connect the external power source to the time-delay lighting circuit; and
   a switch status detection circuit configured to detect an on/off status of the control switch, and when the control switch is detected to be switched off, control the energy storage and discharge device to provide power to the light emitting component;

wherein:
   an input end of the first voltage-current conversion circuit is connected to the external power source via the control switch, and an output end of the first voltage-current conversion circuit is connected to the light emitting component;
   the switch status detection circuit is connected to the first voltage-current conversion circuit and the energy storage and discharge device, respectively; and
   the charging controller is connected to the external power source and the energy storage and discharge device, respectively.

2. The time-delay lighting circuit according to claim 1, wherein the first voltage-current conversion circuit is further configured to:
   when the control switch is switched on, convert the first inputted current from the external power source to the current satisfying working conditions of the light emitting component; and
   when the switch status detection circuit detects that the control switch is switched off, according to a switch-on signal from the switch status detection circuit, convert the first inputted current from the energy storage and discharge device to the current satisfying working conditions of the light emitting component.

3. The time-delay lighting circuit according to claim 1, wherein the switch status detection circuit is further configured to:
   output a switch-on signal to the first voltage-current conversion circuit when the control switch is detected to be switched off, such that the energy storage and discharge device provides power supply to the light emitting component via the first voltage-current conversion circuit;
   detect a voltage outputted by the energy storage and discharge device; and
   output a switch-off signal to the first voltage-current conversion circuit when the voltage outputted by the energy storage and discharge device is detected to be lower than a preset value, wherein the first voltage-current conversion circuit switches off the power supply from the energy storage and discharge device to the light emitting component when receiving the switch-off signal.

4. The time-delay lighting circuit according to claim 1, further comprising:
   an AC-DC converter configured to convert an AC output of the external power source to a DC output;
   wherein:
   an input end of the AC-DC converter is connected to the external power source via the control switch; and
   an output end of the AC-DC converter is connected to the first voltage-current conversion circuit and the charging controller, respectively.

5. The time-delay lighting circuit according to claim 4, wherein the switch status detection circuit is further configured to:
   detect the on/off status of the control switch by determining whether an output voltage of the AC-DC converter is below a threshold; and
   when the output voltage of the AC-DC converter is detected to be less than the threshold, the switch status detection circuit outputs a switch-on signal to the first voltage-current conversion circuit for enabling the energy storage and discharge device to provide power to the light emitting component.

6. The time-delay lighting circuit according to claim 1, further comprising:

a second voltage-current conversion circuit configured to convert a second inputted current to the current satisfying working conditions of the light emitting component;

wherein:

the second voltage-current conversion circuit is connected to the energy storage and discharge device, and the switch status detection circuit, respectively;

when the switch status detection circuit detects the control switch is switched-off and outputs a switch-on signal to the second voltage-current conversion circuit, the second inputted voltage is from the energy storage and discharge device for enabling the energy storage and discharge device to provide power to the light emitting component; and when the control switch is switched-on, the first voltage-current conversion circuit converts the first inputted current from the external power source to the current satisfying working conditions of the light emitting component.

7. The time-delay lighting circuit according to claim 6, wherein:

the light emitting component includes multiple light emitting entities;

the switch status detection circuit is further configured to send a switch-on signal to the second voltage-current conversion circuit for controlling the energy storage and discharge device to provide power supply to at least one of the multiple light emitting entities; and the second voltage-current conversion circuit is further configured to, when receiving the switch-on signal from the switch status detection circuit, convert the second inputted current to the current satisfying working conditions of the at least one of the multiple light emitting entities.

8. A time-delay lighting circuit for controlling a light emitting component, an input end of the time-delay lighting circuit being connected to an external power source via a control switch, comprising:

an AC-DC converter, a first voltage-current conversion circuit, a switch status detection circuit, a second voltage-current conversion circuit, a charging controller, and an energy storage and discharge device;

wherein:

the AC-DC converter is connected to the first voltage-current conversion circuit, and the first voltage-current conversion circuit is connected to the light emitting component;

the AC-DC converter is connected to the switch status detection circuit and the charging controller, respectively, the switch status detection circuit is connected to the second voltage-current conversion circuit, the energy storage and discharge device is connected to the charging controller and the second voltage-current conversion circuit, respectively, and the second voltage-current conversion circuit is connected to the light emitting component;

the switch status detection circuit is configured to detect an on/off status of the control switch, and when the control switch is detected to be switched off, output a switch-on signal to the second voltage-current conversion circuit;

the second voltage-current conversion circuit is configured to receive the switch-on signal outputted by the switch status detection circuit, and control the energy storage and discharge device to provide a voltage satisfying preset conditions to the light emitting component; and the charging controller is configured to charge the energy storage and discharge device when the AC-DC converter outputs a direct voltage.

9. The time-delay lighting circuit according to claim 8, wherein the energy storage and discharge device is a supercapacitor.

10. The time-delay lighting circuit according to claim 8, wherein the switch status detection circuit is further configured to:

detect a voltage outputted by the energy storage and discharge device; and output a switch-off signal to the second voltage-current conversion circuit when the voltage outputted by the energy storage and discharge device is detected to be lower than a preset value, wherein the second voltage-current conversion circuit is further configured to turn off the power supply from the energy storage and discharge device to the light emitting component when receiving the switch-off signal.

11. The time-delay lighting circuit according to claim 8, wherein the AC-DC converter comprises a filter circuit, a rectifier bridge and a second capacitor;

the filter circuit includes a first inductor and a first capacitor, the first capacitor is connected to the external power source in parallel, a first end of the first inductor is connected to a first end of the first capacitor, a second end of the first inductor is connected to a first AC input end of the rectifier bridge, and a second AC input end of the rectifier bridge is connected to a second end of the first capacitor;

a first end of the second capacitor is connected to a first DC output end of the rectifier bridge and an input end of the first voltage-current conversion circuit at a first connection point, and a second end of the second capacitor is connected to a second DC output end of the rectifier bridge and is further connected to ground.

12. The time-delay lighting circuit according to claim 11, wherein the first voltage-current conversion circuit comprises an absorbing circuit, a transformer, a first diode, a third capacitor, a voltage-current conversion unit, and a first resistor;

the absorbing circuit is connected to an output end of the AC-DC converter, a first input end of the transformer, and a first input end of the voltage-current conversion unit, respectively;

a first output end of the transformer is connected to an anode of the first diode, and a second output end of the transformer is connected to a second end of the third capacitor and is further connected to ground;

a cathode of the first diode is connected to a first end of the third capacitor, and a first end of the light emitting component;

a first output end of the voltage-current conversion unit is connected to a first end of the first resistor, the first output end of the voltage-current conversion unit is connected to a second end of the light emitting component, a second output end of the voltage-current conversion unit is connected to ground, and a source (S) electrode of a MOS transistor in the voltage-current conversion unit is connected to ground; and a second end of the first resistor is connected to ground.

13. The time-delay lighting circuit according to claim 12, wherein the absorbing circuit includes a fourth capacitor, a second resistor and a second diode, the fourth capacitor is connected to the second resistor in parallel, a first end of the fourth capacitor and a first end of the second resistor are connected to the output end of the AC-DC converter, respectively, a first input end of the transformer and the first input end of the voltage-current conversion unit are connected at the first connection point, respectively, a second end of the fourth capacitor, a second end of the second resistor are connected to the cathode of the first diode, respectively, and an anode of the second diode is connected to a second input end of the transformer and a drain (D) electrode of the MOS transistor in the voltage-current conversion unit, respectively.

14. The time-delay lighting circuit according to claim 11, wherein the first voltage-current conversion circuit comprises a voltage-current conversion unit, a first resistor, an inductor, a diode, and a third capacitor;

an input end of the voltage-current conversion unit, and a drain (D) electrode of a MOS transistor in the voltage-current conversion unit are connected at the first connection point, a source (S) electrode of the MOS transistor in the voltage-current conversion unit is connected to a first end of the first resistor and a cathode of the diode, respectively, the first output end of the AC-DC converter is connected to a second end of the first resistor and an input end of the inductor, respectively, a second output end of the voltage-current conversion unit is connected to ground;

an output end of the inductor is connected to a first end of the third capacitor, and is further connected to a first end of the light emitting component; and an anode of the diode is connected to a second end of the third capacitor and is further connected to ground.

15. The time-delay lighting circuit according to claim 8, wherein:

the light emitting component includes multiple light emitting entities;

the switch status detection circuit is further configured to send a switch-on signal to the second voltage-current conversion circuit for controlling the energy storage and discharge device to provide power supply to at least one of the multiple light emitting entities; and the second voltage-current conversion circuit is further configured to, when receiving the switch-on signal from the switch status detection circuit, convert an inputted current to a current satisfying working conditions of the at least one of the multiple light emitting entities.

16. A time-delay lighting circuit for controlling a light emitting component, an input end of the time-delay lighting circuit being connected to an external power source via a control switch, comprising:

a first voltage-current conversion circuit configured to convert a current inputted from the external power source to a current satisfying working conditions of the light emitting component;

an energy storage and discharge device configured to provide power to the light emitting component when the control switch is switched off to disconnect the external power source from the time-delay lighting circuit;

a charging controller configured to charge the energy storage and discharge device when the control switch is switched on to connect the external power source to the time-delay lighting circuit; and a second voltage-current conversion circuit configured to convert a current inputted from the energy storage and discharge device to the current satisfying working conditions of the light emitting component;

wherein:

an input end of the first voltage-current conversion circuit is connected to the external power source via the control switch, and an output end of the first voltage-current conversion circuit is connected to the light emitting component;

the second voltage-current conversion circuit is connected to the energy storage and discharge device and the light emitting component, respectively; and the charging controller is connected to the external power source and the energy storage and discharge device, respectively.

17. The time-delay lighting circuit according to claim 16, further comprising:

an AC-DC converter configured to convert an AC output of the external power source to a DC output;

wherein:

an input end of the AC-DC converter is connected to the external power source via the control switch; and an output end of the AC-DC converter is connected to the first voltage-current conversion circuit and the charging controller, respectively.

18. The time-delay lighting circuit according to claim 16, wherein the second voltage-current conversion circuit is further configured to:

detect a voltage inputted from the energy storage and discharge device;

turn off a power supply from the energy storage and discharge device to the light emitting component when the voltage inputted from the energy storage and discharge device is detected to be lower than a preset value; and turn on the power supply from the energy storage and discharge device to the light emitting component when the voltage inputted from the energy storage and discharge device is detected to be greater than the preset value.

19. A time-delay lighting device, comprising:

a light emitting component and a time-delay lighting circuit board; wherein the time-delay lighting circuit according to claim 1 is disposed on the time-delay lighting circuit board, and the light emitting component is electrically connected to the time-delay lighting circuit board.

20. The time-delay lighting device according to claim 19, further comprising:

a lamp cup, a lamp holder, a heat sink, and a lamp cover, wherein, the time-delay lighting circuit is disposed inside the lamp cup, and a closed-end of the lamp cup is connected to the lamp holder;

the light emitting component is disposed in an open-end of the lamp cup, the lamp cover is disposed outside the light emitting component, and the heat sink is disposed between the light emitting component and the time-delay lighting circuit board.

\* \* \* \* \*